US012305146B2

(12) United States Patent
Bui et al.

(10) Patent No.: US 12,305,146 B2
(45) Date of Patent: May 20, 2025

(54) COMPOSITION FOR CLEANING AND ASSESSING CLEANLINESS IN REAL-TIME

(71) Applicant: Medivators Inc., Minneapolis, MN (US)

(72) Inventors: Huyen Bui, Brooklyn Park, MN (US); Tuan Nguyen, Chaska, MN (US); Mer Win Cheong, Pomezia (IT); Kristopher Murphy, New Brighton, MN (US); Nicholas G. Bromiley, Annandale, MN (US); Joseph G. Johnnie, Pearland, TX (US); Jing Yu, Pasadena, CA (US)

(73) Assignee: Medivators Inc., Minneapolis, MN (US)

( * ) Notice: Subject to any disclaimer, the term of this patent is extended or adjusted under 35 U.S.C. 154(b) by 658 days.

(21) Appl. No.: 17/289,488

(22) PCT Filed: Nov. 1, 2019

(86) PCT No.: PCT/US2019/059357
§ 371 (c)(1),
(2) Date: Apr. 28, 2021

(87) PCT Pub. No.: WO2020/096890
PCT Pub. Date: May 14, 2020

(65) Prior Publication Data

US 2022/0195334 A1 Jun. 23, 2022

Related U.S. Application Data

(60) Provisional application No. 62/755,789, filed on Nov. 5, 2018.

(51) Int. Cl.
*C11D 1/72* (2006.01)
*C11D 1/722* (2006.01)
(Continued)

(52) U.S. Cl.
CPC ................ *C11D 1/72* (2013.01); *C11D 1/722* (2013.01); *C11D 3/0026* (2013.01);
(Continued)

(58) Field of Classification Search
CPC ......... C11D 1/72; C11D 1/722; C11D 3/2096; C11D 3/2068; C11D 3/48; C11D 3/044; C11D 3/06
(Continued)

(56) References Cited

U.S. PATENT DOCUMENTS 6,013,034 A 1/2000 Fernandes Da Cunha Vaz et al.
6,174,291 B1 1/2001 McMahon et al.
(Continued)

FOREIGN PATENT DOCUMENTS

CN 1613308 5/2005
CN 1836508 9/2006
(Continued)

OTHER PUBLICATIONS

International Search Report and Written Opinion of the International Searching Authority Dated Feb. 14, 2020, of International PCT Application No. PCT/US2019/59357 filed Nov. 1, 2019.
(Continued)

*Primary Examiner* — Gregory R Delcotto

(57) ABSTRACT

This disclosure describes a composition which can provide real-time feedback during medical device cleaning or reprocessing. The composition can be used to monitor the amount of biological material cleaned from medical devices and to determine when cleaning is complete. The disclosure also relates to a method of cleaning, or assessing the cleanliness of, a medical device such as an endoscope. Cleanliness can be assessed by contacting the medical device with the composition, shining an excitation light on the composition, and measuring intensity of resulting fluorescence over time.

20 Claims, 6 Drawing Sheets

(51) Int. Cl.
*C11D 3/00* (2006.01)
*C11D 3/04* (2006.01)
*C11D 3/06* (2006.01)
*C11D 3/20* (2006.01)
*C11D 3/33* (2006.01)
*C11D 3/43* (2006.01)
*C11D 3/48* (2006.01)

(52) U.S. Cl.
CPC .......... *C11D 3/0047* (2013.01); *C11D 3/0073* (2013.01); *C11D 3/044* (2013.01); *C11D 3/06* (2013.01); *C11D 3/2041* (2013.01); *C11D 3/2072* (2013.01); *C11D 3/2096* (2013.01); *C11D 3/33* (2013.01); *C11D 3/48* (2013.01); *C11D 2111/20* (2024.01); *C11D 2111/46* (2024.01)

(58) Field of Classification Search
USPC ....... 510/130, 137, 138, 161, 238, 421, 505, 510/506, 510
See application file for complete search history.

(56) References Cited

U.S. PATENT DOCUMENTS

| | | | | |
|---|---|---|---|---|
| 6,694,176 | B1 | 2/2004 | Tsujita et al. | |
| 6,793,880 | B2 | 9/2004 | Kippenhan, Jr. | |
| 7,905,831 | B2 | 3/2011 | Noguchi et al. | |
| 7,918,788 | B2 | 4/2011 | Lin et al. | |
| 7,942,810 | B2 | 5/2011 | Uchimura et al. | |
| 8,084,756 | B2 | 12/2011 | Tokhtuev et al. | |
| 8,227,766 | B2 | 7/2012 | Chapman | |
| 8,353,818 | B1 | 1/2013 | Sasaki | |
| 8,454,937 | B2 | 6/2013 | Claudio | |
| 8,593,626 | B2 | 11/2013 | Brouwer | |
| 8,933,008 | B2 * | 1/2015 | Whiteley | ............... A01N 43/28 510/161 |
| 9,167,160 | B2 | 10/2015 | King | |
| 9,566,415 | B2 | 2/2017 | Soutorine | |
| 9,649,019 | B2 | 5/2017 | Noack | |
| 9,820,630 | B2 | 11/2017 | Tomita | |
| 9,892,513 | B2 | 2/2018 | Gurevich et al. | |
| 9,907,624 | B2 | 3/2018 | Vazales et al. | |
| 10,254,224 | B2 | 4/2019 | Bolduc et al. | |
| 10,266,793 | B2 | 4/2019 | Labib et al. | |
| 10,358,622 | B2 | 7/2019 | Stokes et al. | |
| 10,660,505 | B2 | 5/2020 | Irion et al. | |
| 10,702,353 | B2 | 7/2020 | Tesar | |
| 10,702,619 | B2 | 7/2020 | Fang et al. | |
| 10,705,020 | B2 | 7/2020 | Baribeau | |
| 10,709,313 | B2 | 7/2020 | Stephenson | |
| 2007/0161859 | A1 | 7/2007 | Kubach | |
| 2010/0068237 | A1 | 3/2010 | Li et al. | |
| 2011/0104223 | A1 | 5/2011 | Li | |
| 2012/0041305 | A1 | 2/2012 | Grissom et al. | |
| 2012/0073614 | A1 | 3/2012 | Otani et al. | |
| 2013/0203845 | A1 | 8/2013 | Whiteley et al. | |
| 2014/0011726 | A1 * | 1/2014 | Mitchell | .................. C11D 3/48 510/391 |
| 2015/0238085 | A1 | 8/2015 | Inoue et al. | |
| 2016/0025653 | A1 | 1/2016 | Jalilian et al. | |
| 2016/0081531 | A1 | 3/2016 | Yoshie | |
| 2016/0279658 | A1 | 9/2016 | Li et al. | |
| 2017/0027420 | A1 | 2/2017 | Choi et al. | |
| 2017/0332891 | A1 | 11/2017 | Yang et al. | |
| 2017/0333584 | A1 | 11/2017 | Fang et al. | |
| 2018/0007895 | A1 * | 1/2018 | Karandikar | ............... A61L 2/18 |
| 2018/0094214 | A1 * | 4/2018 | Labib | ....................... A61B 1/00 |

FOREIGN PATENT DOCUMENTS

| | | | | |
|---|---|---|---|---|
| CN | 1964665 | | 5/2007 | |
| CN | 101564545 | | 10/2009 | |
| CN | 102580124 | B | 6/2013 | |
| CN | 103749445 | | 4/2014 | |
| CN | 105346758 | | 2/2016 | |
| CN | 105379712 | | 3/2016 | |
| CN | 107711835 | A | 2/2018 | |
| CN | 108552173 | A | 9/2018 | |
| CN | 108627519 | | 10/2018 | |
| EP | 1468700 | A1 * | 10/2004 | ............. A01N 31/02 |
| EP | 2144635 | A | 1/2017 | |
| JP | 2971608 | | 11/1999 | |
| JP | 2005305182 | | 11/2005 | |
| JP | 2008-007408 | A2 | 1/2008 | |
| JP | 2008054861 | | 3/2008 | |
| JP | 2009142490 | | 7/2009 | |
| JP | 2009165506 | | 7/2009 | |
| JP | 2009172054 | | 8/2009 | |
| JP | 2014041043 | | 3/2014 | |
| KR | 20130079386 | | 7/2013 | |
| KR | 20150123421 | A | 11/2015 | |
| WO | 2006096797 | | 9/2006 | |
| WO | 2009032644 | A2 | 3/2009 | |
| WO | 2010129532 | | 11/2010 | |
| WO | WO-2016197148 | A1 * | 12/2016 | ............. A01N 25/30 |
| WO | WO-2017027418 | A1 * | 2/2017 | ............. A01N 37/46 |
| WO | WO-2017148524 | A1 * | 9/2017 | ........... C11D 3/0073 |

OTHER PUBLICATIONS

Peer Contribution by China National Intellectual Property Jan. 16, 2020, of International PCT Application No. PCT/US2019/59357 filed Nov. 1, 2019.

Peer Contribution by European Patent Office Jan. 15, 2020, of International PCT Application No. PCT/US2019/59357 filed Nov. 1, 2019.

Peer Contribution by Japan Patent Office Jan. 21, 2020, of International PCT Application No. PCT/US2019/59357 filed Nov. 1, 2019.

Peer Contribution by Korean Intellectual Property Office Jan. 20, 2020, of International PCT Application No. PCT/US2019/59357 filed Nov. 1, 2019.

International Preliminary Report on Patentability issued in PCT/US2019/059357, mailed May 20, 2021.

* cited by examiner

COMPOSITION FOR CLEANING AND ASSESSING CLEANLINESS IN REAL-TIME

PRIORITY CLAIM

This application claims priority to and the benefit of U.S. Provisional application with Ser. No. 62/755,789, filed on Nov. 5, 2018, entitled COMPOSITION FOR CLEANING AND ASSESSING CLEANLINESS IN REAL-TIME, which is herein incorporated by reference in its entirety.

TECHNICAL FIELD

This disclosure relates to cleaning and reprocessing of reusable medical equipment. Some embodiments relate to a composition or methods for cleaning, detecting residual biological material, and assessing cleanliness.

BACKGROUND

Specific de-contamination procedures and protocols are utilized to clean reusable medical equipment. As one example in the medical setting involving reusable medical equipment, endoscopes that are designed for use in multiple procedures must be fully cleaned and reprocessed after a medical imaging procedure to prevent the spread of infectious organisms. Once an endoscope is used in the medical procedure, an endoscope is considered contaminated until it is properly cleaned and disinfected through a series of specific cleaning actions.

A number of protocols and assisting equipment for cleaning, disinfection, and inspection are used by current medical practices to reprocess endoscopes and prepare them for subsequent procedures. For example, various machines and devices such as automated endoscope reprocessors are used to perform deep cleaning of an endoscope, through the application of disinfecting solutions. High-level disinfection or sterilization processes are typically performed after manual cleaning to remove any remaining amounts of soils and biological materials. However, an endoscope is not considered as ready for high-level disinfection or sterilization until after an effective and properly performed manual cleaning. Ineffective manual cleaning can hamper subsequent cleaning steps. For example, significant biological residue such as biofilm may prevent the device from being fully exposed to cleaning and disinfecting chemicals. However, it can be challenging to determine whether manual cleaning was effective, whether residue remains, or whether manual cleaning is complete.

During existing manual cleaning procedures, a human technician may inspect the endoscope and perform various types of inspections, verifications, or tests on the external surfaces and operational components of the endoscope. However, many types of contaminants within or on the endoscope are not readily visible or observable by a human Therefore, there is a need to improve cleaning processes of endoscopes to reduce the incidence and amount of residual biological material carried forward to subsequent clean steps or use of the endoscope, as well as a need for processes to better determine when a given cleaning step, e.g., manual cleaning, is effective and complete.

SUMMARY

The present disclosure provides a composition useful for cleaning medical devices and also for assessing the cleanliness of the medical devices. The composition can be used to monitor the amount of biological material cleaned from medical devices and to determine when cleaning is complete. For example, the composition can detect the concentration of residual protein after the manual washing cycle of a medical device such as an endoscope. The composition contains ortho-phthalaldehyde and has a pH of about 9.0 to about 13.0 and, in various examples, one or more of a glycol, a surfactant, and a buffer system.

The present disclosure provides a method of cleaning a medical device. The method involves contacting the medical device with the composition described herein for a period of time effective to clean the medical device. The method can further involve shining an excitation light on the cleaning composition and measuring intensity of the fluorescence of the cleaning composition. The intensity of fluorescence can be monitored to assess the extent of cleaning and cleaning is determined to be sufficient or substantially complete when the fluorescence shows a substantially steady state of intensity.

The present disclosure also provides a method of assessing the cleanliness of a medical device, which in various examples can provide real-time feedback during medical device cleaning or reprocessing. The method involves contacting the medical device with any of the compositions described herein, shining an excitation light on the composition and measuring the signal emitted from the composition, sustaining contact between the medical device and the composition until the composition shows a substantially steady state of intensity of fluorescence, and then removing the composition from contact with the medical device. The method further comprises rinsing the medical device with water, shining the excitation light on the water used for rinsing and measuring the signal emitted from the water, and continuing to rinse the medical device with water until the water shows a measurement, e.g., an intensity of fluorescence, substantially equal to a baseline measurement for water.

The disclosure relates to a composition which can provide real-time feedback during medical device cleaning or reprocessing. The composition can be used to monitor the amount of biological material cleaned from medical devices and to determine when cleaning is complete. The disclosure also relates to a method of cleaning, or assessing the cleanliness of, a medical device such as an endoscope. Cleanliness can be assessed by contacting the medical device with the composition, shining an excitation light on the composition, and measuring intensity of resulting fluorescence over time.

Advantages, some of which are unexpected, are achieved by various examples of the present disclosure. For example, the present disclosure describes a composition which has the advantage of having a cleaning function and also a detection function. The advantage of performing cleaning and detection simultaneously can greatly improve efficiency of endoscope reprocessing, for example, by accelerating or converging steps during manual cleaning and inspection.

It is also highly surprising that ortho-phthalaldehyde can be used in a strongly alkaline detergent system. For example, ortho-phthalaldehyde is susceptible to degradation via a Cannizzaro reaction mechanism, mediated by hydroxides, which destroys the aldehyde to produce carboxylic acids and alcohols. Moreover, in prior processes endoscopes were cleaned by using detergent at a separate step from high level disinfectants such as ortho-phthalaldehyde; specifically, the detergent was washed off prior to use of the ortho-phthalaldehyde. Commercially available ortho-phthalaldehyde solution, e.g., Rapicide® OPA/28 disinfectant, is accompanied with a label advising that, the treated endoscope should be thoroughly cleaned, but that all surfaces and lumen should be thoroughly rinsed and dried prior to using high-level disinfectant. Even though minimal detergent, if any, would contact the high-level disinfectant, the label further clarifies that Rapicide® OPA/28 is not compatible with cleaning agents and that any detergent used should be mild pH, and highly alkaline detergent should be avoided. It is thus surprising that a highly functional cleaning composition and a greatly improved protein detection composition arose from the combination of a high alkaline detergent and ortho-phthalaldehyde-containing disinfectant.

In various examples, the composition can provide rapid and highly sensitive protein detection. Whereas prior methods of detecting protein such as microBCA required elevated temperature and long incubation periods typically greater than 60 minutes, the present composition in various examples can offer the advantage of nearly real time monitoring at room temperature.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
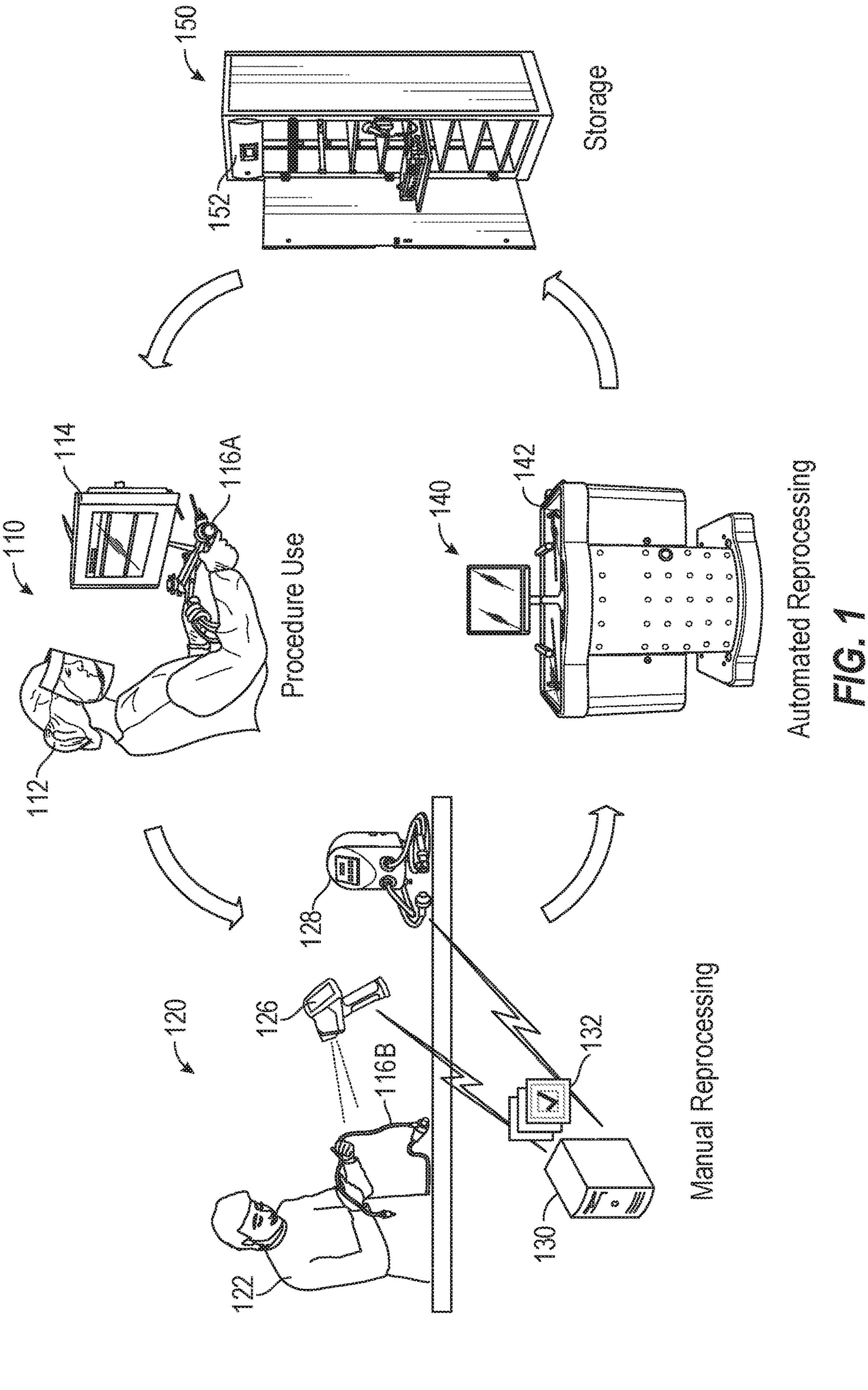
FIG. 1 illustrates an overview of devices and systems involved in stages of endoscope use and reprocessing, according to various examples discussed herein.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y" unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "room temperature" as used herein refers to a temperature of about 15° C. to 28° C. In various examples, room temperature is achieved without direct heating or cooling on the composition or process, e.g., without use of a temperature-controlled water bath, heating source, or cooling source.

The term "pH" as used herein refers to the measure of the acidity or basicity of an aqueous solution. Solutions with a pH less than 7, 6.5, 6, 5.5, 5, 4.5 or 4 are commonly described as acidic and solutions with a pH greater than 7, 7.5, 8, 8.5, 9, 9.5 or 10 are commonly described as basic or alkaline. Pure water has a pH of approximately 7. Primary pH standard values can be determined, for example, using a concentration cell with transference, by measuring the potential difference between a hydrogen electrode and a standard electrode such as the silver chloride electrode. Measurement of pH for aqueous solutions can be done, e.g., with a glass electrode and a pH meter, or using indicators. Without being limited to theory, pH can be understood as the negative logarithm of the activity of the (solvated) hydronium ion, more often expressed as the measure of the hydronium ion concentration. In various examples, the composition can be in concentrated form having a pH of about 11.9 to about 12.2. Upon dilution with a suitable amount of diluent (e.g., at a 0.5% concentration of concentrate), the pH of the resulting solution can be about 9.5 to about 11.5.

The term "surfactant" refers to a compound capable of lowering the surface tension of a liquid, the interfacial tension between two liquids, or that between a liquid and a solid. Surfactants may act as detergents, wetting agents, emulsifiers, foaming agents, and/or dispersants. The surfactant can be non-ionic, anionic or cationic. Additionally, the surfactant can include one or more non-ionic surfactants, one or more anionic surfactants, and/or one or more cationic surfactants.

The surfactant can be present in any suitable and effective amount. For example, the surfactant can be present in a combined amount of about 0.1 wt. % to about 20 wt. % of the composition. In more examples, the surfactant can be present in a combined amount of about 0.25 wt. % to about 15 wt. % of the composition. In further examples, the surfactant can be present in a combined amount of about 0.5 wt. % to about 10 wt. % of the composition.

In additional examples, the surfactant can include Pluronic® L44 polaxamer 124, present in about 0.1 wt. % to about 1.0 wt. % of the composition. In further examples, the surfactant can include 2-butoxyethanol, present in about 0.5 wt. % to about 10.0 wt. % of the composition. In yet more examples, the surfactant can include Tergitol® 15-S-12 surfactant, present in about 0.1 wt. % to about 5.0 wt. % of the composition. In further examples, the surfactant can include Pluronic® L44 polaxamer 124, present in about 0.1 wt. % to about 1.0 wt. % of the composition; 2-butoxyethanol, present in about 0.5 wt. % to about 10.0 wt. % of the composition; and Tergitol® 15-S-12 surfactant, present in about 0.1 wt. % to about 5.0 wt. % of the composition.

The term "non-ionic surfactant" or "nonionic surfactant" refers to a surfactant which is neutral, and which does not readily dissociate into ionic forms in solution. Examples of non-ionic surfactants are ethoxylated alcohols, alkylphenol ethoxylates, fatty acid ethoxylates, terminally blocked ethoxylates, fatty acid esters of sorbitan, fatty acid esters of ethoxylated sorbitan, Pluronics® poloxamers. Another suitable class of non-ionic surfactants includes the Tergitol® surfactants.

Poloxamers are nonionic triblock copolymers composed of a central hydrophobic chain of polyoxypropylene (poly (propylene oxide)) flanked by two hydrophilic chains of polyoxyethylene (poly(ethylene oxide)). Poloxamers are also known by the trade name Pluronics®.

The term "Pluronic® L44 surfactant Poloxamer 124 block copolymer" refers to specific nonionic triblock copolymers composed of a central hydrophobic chain of polyoxypropylene (poly(propylene oxide)) flanked by two hydrophilic chains of polyoxyethylene (poly(ethylene oxide)). In examples, the Pluronic® L44 surfactant Poloxamer 124 block copolymer is present in at least about 2.0 wt. % of the composition. In additional examples, the Pluronic® L44 surfactant Poloxamer 124 block copolymer is present in about 2.0 wt. % to about 8 wt. % of the composition.

Additional suitable classes of non-ionic surfactants include, e.g., alkyl polyglucosides (e.g., TRITON™ BG-10 Surfactant, TRITON™ CG-50 Surfactant, TRITON™ CG-600 Surfactant, TRITON™ CG-650 Surfactant, TRITON™ CG-110 Surfactant); branched Secondary Alcohol Ethoxylates (e.g., TERGITOL™ TMN Series); Ethylene Oxide/Propylene Oxide Copolymers (e.g., TERGITO™ L Series, TERGITOL™ XD, XH, and XJ Surfactants); Low Foam Surfactants (e.g., ECOSURF™ LF Surfactants, TRITON™ CF Surfactants, TRITON™ DF Surfactants, and TERGITOL™ MinFoam Surfactants); Nonyl phenol Ethoxylates (e.g., TERGITOL™ NP Series); Octylphenol Ethoxylates (e.g., TRITON™ X Series), Secondary Alcohol Ethoxylates (e.g., TERGITOL™ 15-S Series); Seed Oil Surfactants (e.g., ECOSURF™ SA Surfactants); Specialty Alkoxylates (e.g., TRITON™ CA Surfactant, TRITON™ N-57 Surfactant, and TRITON™ X-207 Surfactant); and Specialty Ethoxylates (e.g., ECOSURF™ EH Surfactants).

The term "anionic surfactant" refers to a surfactant which has a net negative charge or refers to a compound which when dissociated in solution results in a surfactant having a negative charge.

The term "cationic surfactant" refers to a surfactant which has a net positive charge or refers to a compound which when dissociated in solution results in a surfactant having a net positive charge.

The term "anticorrosive agent" or "corrosion inhibitor" refers to a compound that, when added to a liquid or gas, decreases the corrosion rate of a material, typically a metal or an alloy. Suitable anticorrosive agents include, e.g., benzotriazole and/or sodium dodecyl sulfate.

The term "chelator" as used herein refers to a compound or ligand capable of forming two or more separate coordinate bonds with a single central atom, in a bidentate or polydentate fashion. Usually these ligands are organic compounds, and may also be called chelants, chelators, chelating agents, or sequestering agents. One example of a chelator is ethylenediaminetetraacetic acid (EDTA).

The term "buffer system" as used herein refers to a mixture of a weak acid and its conjugate base, or vice versa, and may include associated counterions. The pH of buffer system is resistant to changes when a small amount of strong acid or base is added to it and thus it is used to prevent changes in the pH of a solution. Buffer solutions are used as a means of keeping pH at a controlled or nearly constant value in a wide variety of chemical applications. Various example of a buffer system includes sodium and potassium phosphate buffer systems, including dibasic and tribasic phosphates, with a source of hydroxide such as sodium hydroxide or potassium hydroxide.

The term "solubilizer" as used herein refers to a substance that makes soluble, aids in the solubility, or otherwise increases the solubility, of a substance in a liquid diluent or carrier. An example of a solubilizer can include a glycol, such as propylene glycol. Where the present disclosure describes use of a glycol, other solubilizers may be suitable as well.

The term "cleaning agent" as used herein refers to a substance capable of effectively cleaning a substrate (e.g., medical device). The substance can effectively remove foreign or extraneous matter, such as biofilm and other biological contaminants, from the substrate. An example of a cleaning agent is diethyl glycol monoethyl ether. Where the present disclosure describes use of diethyl glycol monoethyl ether, other cleaning agents may be suitable as well.

The term "antifoaming agent" refers to a compound that, when added to a liquid or gas, decreases the amount air-liquid emulsification, decreases the amount foaming or, in some examples, provides a surfactant effect without increasing foaming. Suitable antifoaming agents include, for example, polyoxypropylene-polyoxyethylene block copolymers such as Pluronic® 10R5 surfactant block copolymer having the CAS Reg. No. 9003-11-6.

The term "diluent" or "carrier" as used herein refers to a liquid medium in which substances are suspended, completely dissolved, or partially dissolved in. In examples of the invention, the diluent can include water (e.g., deionized water or reverse osmosis water).

The term "purified water" as used herein refers to water that is mechanically filtered or processed to be cleaned for consumption. Distilled water and deionized (DI) water have been the most common forms of purified water, but water can also be purified by other processes including reverse osmosis, carbon filtration, microfiltration, ultrafiltration, ultraviolet oxidation, or electrodialysis, and water can also be demineralized. Various examples of the disclosure can use purified water.

The term "demineralized water" as used herein refers to water which has been removed of mineral ions, including, e.g., cations such as sodium, calcium, iron, and copper, and anions such as chloride and sulfate. Deionization is a chemical process that uses specially manufactured ion-exchange resins which exchange hydrogen ion and hydroxide ion for dissolved minerals, which then recombine to form water. Because most non-particulate water impurities are dissolved salts, deionization produces a high purity water that is generally similar to distilled water, and this process is quick and without scale buildup. However, deionization does not significantly remove uncharged organic molecules, viruses or bacteria, except by incidental trapping in the resin. Specially made strong base anion resins can remove Gram-negative bacteria. Deionization can be done continuously and inexpensively using electrodeionization. Various examples of the disclosure can use demineralized water.

The term "reversed osmosis water" refers to purified water obtained using a semipermeable membrane. This membrane technology is not properly a filtration method. In reverse osmosis, an applied pressure is used to overcome osmotic pressure, a colligative property, that is driven by chemical potential, a thermodynamic parameter. Reverse osmosis can remove many types of molecules and ions from solutions, and is used in both industrial processes and the production of potable water. The result is that the solute is retained on the pressurized side of the membrane and the pure solvent is allowed to pass to the other side. To be "selective," this membrane should not allow large molecules or ions through the pores (holes), but should allow smaller components of the solution (such as the solvent) to pass freely. Various examples of the disclosure can use reversed osmosis water.

The term "medical device" as used herein includes medical devices with moving parts and without moving parts. The medical device may be an instrument, apparatus or implant. Examples range from simple devices such as tongue depressors, medical thermometers, and disposable gloves to advanced devices such as computers which assist in the conduct of medical testing, implants, and prostheses. An example of a medical device is an endoscope, which may be a rigid or flexible endoscope. In various examples, a medical device is a device used to examine, access or interact with a patient, including with the interior of a hollow organ or body cavity of the patient.

Reprocessing Endoscopes and Other Medical Devices.

Reprocessing endoscopes and other medical devices involve various types and levels of inspection. For instance, national guidelines for endoscope cleaning recommend protein and carbohydrate detection, to assess the level of cleanliness achieved. While a number of techniques have been developed and promoted for the detection of residual contamination, the levels of detection and the ease of use of these techniques are variable, sluggish and inefficient in many real-world settings.

Various compositions and techniques are described herein for improved cleaning of endoscopes and other medical devices and for improved detection of residual biological material therein using fluorescence detection. Detection of fluorescence emitted from treated biological materials may be used to identify residual contamination on a medical device or in particular components thereof. Such fluorescence may be triggered, identified, and detected as part of manual or automated actions occurring in a cleaning workflow, including during, before or after, cleaning, disinfecting, rinsing or inspection.

Endoscope suction channels are particularly susceptible to the buildup of biological residue such as biofilm if inadequately cleaned due to the high levels of body fluids they carry during an endoscopic procedure including, but not limited to, blood, tissue, feces, bile, etc. The external surfaces of the endoscope may also propagate biofilm and other biological residues unbeknown and undetected by the user. Such residue may not be easily detected or removed in either automated cleaning machines or with manual human inspection. Thus, the use of fluorescence detection with the presently described device configurations and techniques enables the identification of such conditions, and the verification of remediation for such conditions.

FIG. 1 illustrates an overview of devices and systems involved in example stages of endoscope use and reprocessing. In the environment illustrated in FIG. 1, a series of stages are sequentially depicted for use and handling of the endoscope, transitioning from a procedure use stage 110, to manual reprocessing stage 120, to an automated reprocessing stage 140, to a storage stage 150. It will be understood that the stages 110, 120, 140, 150 as depicted and described provide a simplified illustration of typical scenarios in the use, handling, and reprocessing for reusable endoscopes. As a result, many additional steps and the use of additional devices and procedures (or, substitute procedures and substitute devices) may be involved in the respective stages.

The procedure use stage 110 depicts a human user 112 (e.g., technician, nurse, physician, etc.) who handles an endoscope. At the commencing of the procedure use stage 110, the endoscope 116A is obtained in a sterile or high-level disinfected/clean state. This disinfected/clean state typically results from reprocessing and storage of the endoscope 116A, although the state may also be provided from a disinfected repair or factory-provided state (not shown). In the procedure use stage 110, the endoscope 116A may be used for various endoscopic procedures (e.g., colonoscopy, upper endoscopy, etc.) on a subject human patient, for any number of diagnostic or therapeutic purposes. During the endoscopic procedures, the endoscope 116A is exposed to biological material from the subject patient or the surrounding environment. Thus, at the completion of the procedure use stage 110, the endoscope 116A exists in a contaminated state.

The disinfected or contamination state of the endoscope 116A may be tracked by a tracking system for purposes of monitoring, auditing, and other aspects of workflow control. An interface 114 to the tracking system is shown, which receives an identifier of the endoscope 116A and provides a graphical status as output. The tracking system may be used in the procedure use stage 110 (and the other stages 120, 140, 150) to identify the use of the endoscope 116A to be associated with a particular imaging procedure, patient, procedure equipment, procedure room, preparation or cleaning protocol, or other equipment or activities. This identifying information may enable the tracking system to track the contamination or disinfected state of the endoscope, and to identify and prevent exposure of contamination or infectious agents to patients or handling personnel from damaged endoscopes or improper cleaning procedures.

After the procedure use stage 110, the endoscope transitions to handling in a manual reprocessing stage 120. The manual reprocessing stage 120 specifically depicts the use of manual cleaning activities being performed by a technician 122, to clean the endoscope 116B. The type of manual cleaning activities may include use of disassembly and removal of components, applying brushes to clear channels, wiping to remove visible liquids and solids, and other human-performed cleaning actions. Some of the manual cleaning activities may occur according to a regulated sequence or manufacturer-specified instructions.

The manual reprocessing stage 120 also depicts the use of a flushing aid device 128 and/or a fluorescence inspection device 126 to conduct additional aspects of cleaning and inspection. In an example, the flushing aid device 128 serves to perform an initial chemical flush of the internal channels of the endoscope 116B (e.g., water, air, or suction channels) with disinfectant, cleaning or detection agents, and may recirculate the agents to sustain contact with the treated surface. The flushing aid device 128 may also enable the performance of leak testing, to verify whether components or structures of the endoscope leak fluid (e.g., leak water or air). In other examples, the flushing or leak test actions performed by the flushing aid device 128 are manually performed by the syringing of chemicals or air into the endoscope channels. The results of the leak testing and the flushing may be tracked or managed as part of a device tracking or cleaning workflow, such as by communicating such results 132 to a tracking computing system 130.

The use of florescence inspection with the fluorescence detection device 126 or other fluorescence detectors may involve aspects of inspection of flushed disinfectant, cleaning or detection agents, or inspection of a clean or contaminated endoscope 116B. In an example, flushing aid device 128 may include a fluorescence detector component for monitoring flushed or recirculated fluids and may also include an emitter or other components of a spectrometer. The results of the fluorescence inspection may include a detection or non-detection of a particular state (e.g., clean, contaminated) for respective components of the endoscope 116B (e.g., a particular surface, channel, etc.) or for the various flushed and recirculated fluids. Such results may be tracked or managed as part of the device tracking or cleaning workflow, including communicating such results 132 to the tracking computing system 130. Further details on the fluorescence inspection process and use cases in which fluorescence may be deployed are discussed in more detail in the examples below.

After completion of the manual reprocessing stage 120, the endoscope is handled in an automated reprocessing stage 140. This may include the use of an automatic endoscope reprocessor (AER) 142, or other machines which provide a high-level disinfection and sterilization of the endoscope. For instance, the AER 142 may perform disinfection for a period of time (e.g., for a period of minutes) to expose the interior channels and exterior surfaces of the endoscope to deep chemical cleaning and disinfectant solutions. The AER 142 may also perform rinsing procedures with clean water to remove chemical residues.

After completion of the automated reprocessing stage 140 and the production of the endoscope in a disinfected state, the endoscope transitions to handling in a storage stage 150. This may include the storage of the endoscope in a sterile storage unit 152. In some examples, this stage may also include the temporary storage of the endoscope in a drying unit. Finally, retrieval of the endoscope from the storage stage 150 for use in a procedure results in transitioning back to the procedure use stage 110.

The overall cleaning workflow provided for an endoscope within the various reprocessing stages 120 and 140 may vary according to the specific type of device, device-specific requirements and components, regulations, and the types of cleaning chemicals and devices applied. The overall cleaning workflow, relative to stages of contamination, may be generally summarized in stages 110, 120, 140, 150, as involving the following steps:

1) Performance of the endoscopic procedure. As will be well understood, the endoscopic procedure results in the highest amount of contamination, as measured by the amount of microbes contaminating the endoscope.
2) Bedside or other initial post-procedure cleaning. This cleaning procedure removes or reduces the soils and biological material encountered on the endoscope during the endoscopic procedure. As a result, the amount of contamination, as measured by the amount of microbes, is reduced.
3) Transport to reprocessing. The more time that is spent between the procedure and reprocessing results in a potential increase in the amount of contamination or difficulty to remove the contamination, due to biological materials drying, congealing, growing, etc.
4) Performance of a leak test (e.g., conducted in the manual reprocessing stage 140 with the flushing aid device 128 or a standalone leak testing device or procedure (not shown)). This leak test is used to verify if any leaks exist within channels, seals, controls, valve housings, or other components of the endoscope. If the endoscope fails the leak test, or encounters a blockage during flushing, then high-level disinfection or sterilization attempted in automated reprocessing will be unable to fully flush and disinfect all areas of the endoscope. Further, if the leak test fails but the instrument is placed in an automatic reprocessing machine, the instrument will be damaged through fluid ingress during the reprocessing cycle. 5) Manual washing (e.g., conducted in the manual reprocessing stage 140 with brushes, flushing, etc.). This aspect of manual washing is particularly important to remove biofilm and lodged biological agents from spaces on or within the endoscope. Biofilm generally refers to biological material that adheres to a surface, which may become resistant or impervious to cleaning and disinfectant solutions. The successful application of manual washing significantly reduces the amount of contamination on the endoscope. In an example, the presently described techniques for detection of fluorescence may be integrated with manual washing and cleaning methods, including the detection of fluorescence from biological materials remaining on surfaces, in rinsing fluids, and the like.
6) Residual contamination inspection (e.g., conducted in manual reprocessing stage 140 with a fluorescence inspection system). Microbes, biofilm and other biological material may resist cleaning if lodged in damaged or irregular portions of the endoscope. A procedure of human-guided or machine-assisted inspection for residue can be used to identify an abnormal state (e.g., a compromised, contaminated state) caused by the presence of biological materials (such as biofilms) within the interior channels, exterior surfaces, or components of the endoscope. Such damage inspection may be performed or confirmed by use of a fluorescence inspection system, fluorescence devices and fluorescence inspection techniques, borescope inspection system, visual inspection system, and other mechanisms discussed herein.

7) High level disinfection or sterilization (e.g., conducted in AER 142). Upon successful conclusion of the high-level disinfection or sterilization process, in an ideal state for an endoscope with no damage, no biological contamination will remain from the original endoscopic procedure. In an example, the presently described techniques for detection of fluorescence may be integrated with high level disinfection or sterilization processes, including the detection of fluorescence from biological materials remaining on surfaces, in rinsing fluids, and the like.

8) Rinse and Air Purge. This stage involves the introduction of clean water and air, to flush any remaining chemical solution and to place the endoscope in a disinfected and clean state. The risk of introducing new contamination may be present if contaminated water or air are introduced to the endoscope.

9) Transport to Storage. This stage involves the transport from the AER or other device to storage. A risk of introducing new contamination may be present based on the method and environment of transport and handling.

10) Storage. This stage involves the storage of the endoscope until needed for a procedure. A risk of introducing new contamination may be present based on the conditions in the storage unit.

11) Transport to Patient. Finally, the endoscope is transported for use in a procedure. A risk of introducing new contamination may also be present based on the method and environment of transport and handling.

Further aspects which may affect contamination may involve the management of valves and tubing used with a patient. For instance, the use of reusable valves, tubing, or water bottles in the procedure may re-introduce contamination to the endoscope. Accordingly, the disinfected state of a processed endoscope can only be provided in connection with the use of other sterile equipment and proper handling in a clean environment. The use of fluorescence detection may also be adapted to the verification of a lack of contamination from any of such states, in connection with cleaning, rinsing, and other forms of fluorescence agents.

Figure 2:
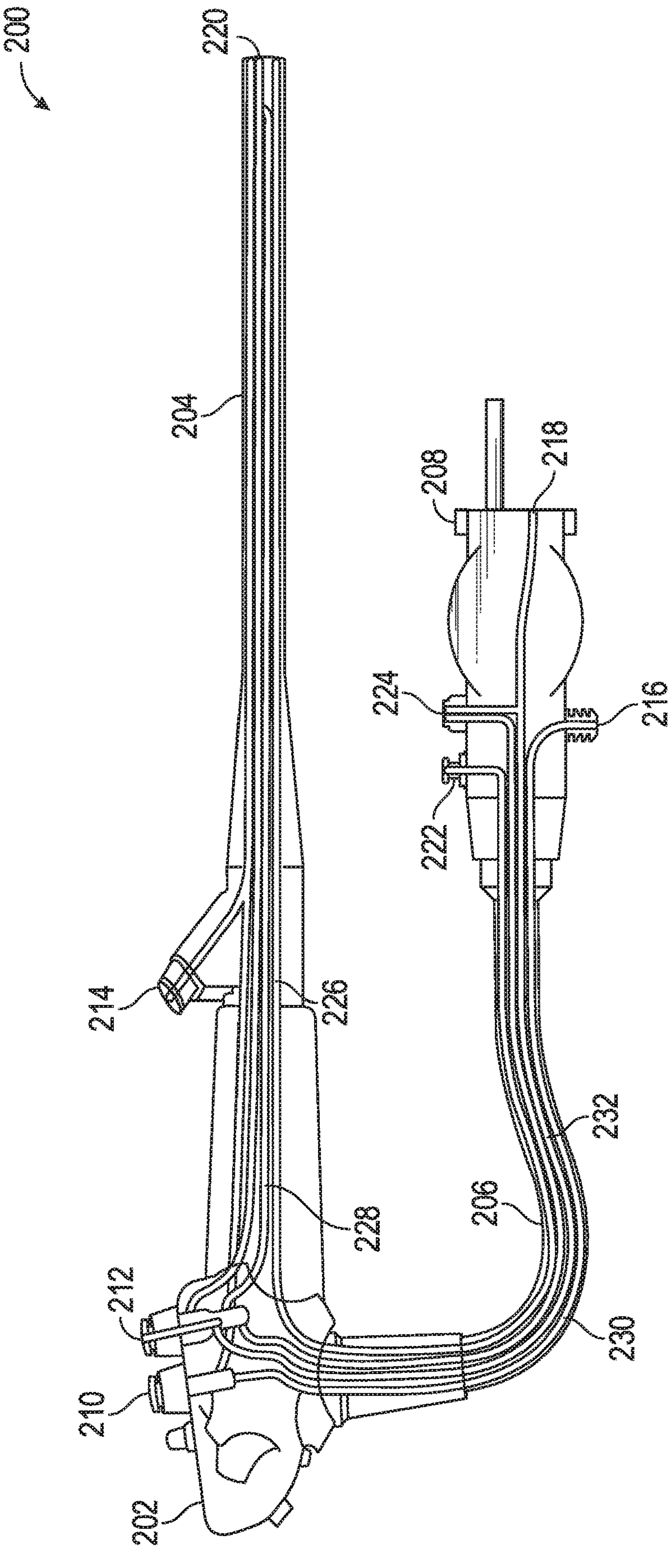
FIG. 2 is a schematic cross-section illustration of an endoscope, operated according to various examples discussed herein.

FIG. 2 is a schematic cross-section illustration of an endoscope 200, operable according to various examples. The endoscope 200 as depicted includes portions that are generally divided into a control section 202, an insertion tube 204, a universal cord 206, and a light guide section 208. A number of imaging, light, and stiffness components and related wires and controls used in endoscopes are not depicted for simplicity. Rather, FIG. 2 is intended to provide a simplified illustration of the channels important for endoscope cleaning workflows. It will be understood that the presently discussed endoscope cleaning workflows will be applicable to other form factors and designs of endoscopes. The techniques, systems, and apparatus discussed herein can also be utilized for inspection operations on other instruments that include lumens that can become contaminated or damaged during use.

The control section 202 hosts a number of controls used to actuate the positioning, shape, and behavior of the endoscope 200. For instance, if the insertion tube 204 is flexible, the control section 202 may enable the operator to flex the insertion tube 204 based on patient anatomy and the endoscopic procedure. The control section 202 also includes a suction valve 210 allowing the operator to controllably apply suction at a nozzle 220 via a suction channel 230. The control section 202 also includes an air/water valve 212 which allows the distribution of air and/or water from an air channel 232 (provided from an air pipe source 218) or a water channel 228 (provided from a water source connected to a water source connector 224) to the nozzle 220. The depicted design of the endoscope 200 also includes a water jet connector 222 via a water-jet channel 226, to provide additional distribution of water separate from the air channel 232.

The universal cord 206 (also known as an "umbilical cable") connects the light guide section 208 to the control section 202 of the endoscope. The light guide section 208 provides a source of light which is distributed to the end of the insertion tube 204 using a fiber optic cable or other light guides. The imaging element (e.g. camera) used for capturing imaging data may be located at in the light guide section 208 or adjacent to the nozzle 220.

As shown, the various channels of the endoscope 200 allow the passage of fluids and objects, which may result in the contamination throughout the extent of the channels. The portion of the suction channel 230 which extends from the biopsy valve 214 to the distal end of the insertion tube 204 (to the nozzle 220) is also known as the biopsy channel. In particular, the biopsy channel, and the remainder of the suction channel 230, is subject to a high likelihood of contamination and/or damage in the course of an endoscopic procedure. For example, the insertion, manipulation, and extraction of instruments (and biological material attached to such instruments) through the suction channel 230 commonly leads to the placement of microbes within the suction channel 230.

Any damage to the interior layer(s) of the biopsy channel, such as in scratches, nicks, or other depressions or cavities to the interior surface caused by instruments moving therein may also lead to deposits of biological material. Such biological material which remains in cavities, or which congeals in the form of biofilm, may be resistant to many manual cleaning techniques such as brushes pulled through the suction channel. Such damage may also occur in the other channels 228, 230, 232, as a result of usage, deterioration, or failure of components. The techniques discussed herein provide enhanced techniques in connection with the inspection and verification of the integrity of the channels 228, 230, 232, and specifically the integrity from deposited biological materials and contamination in such channels 228, 230, 232.

Figure 3:
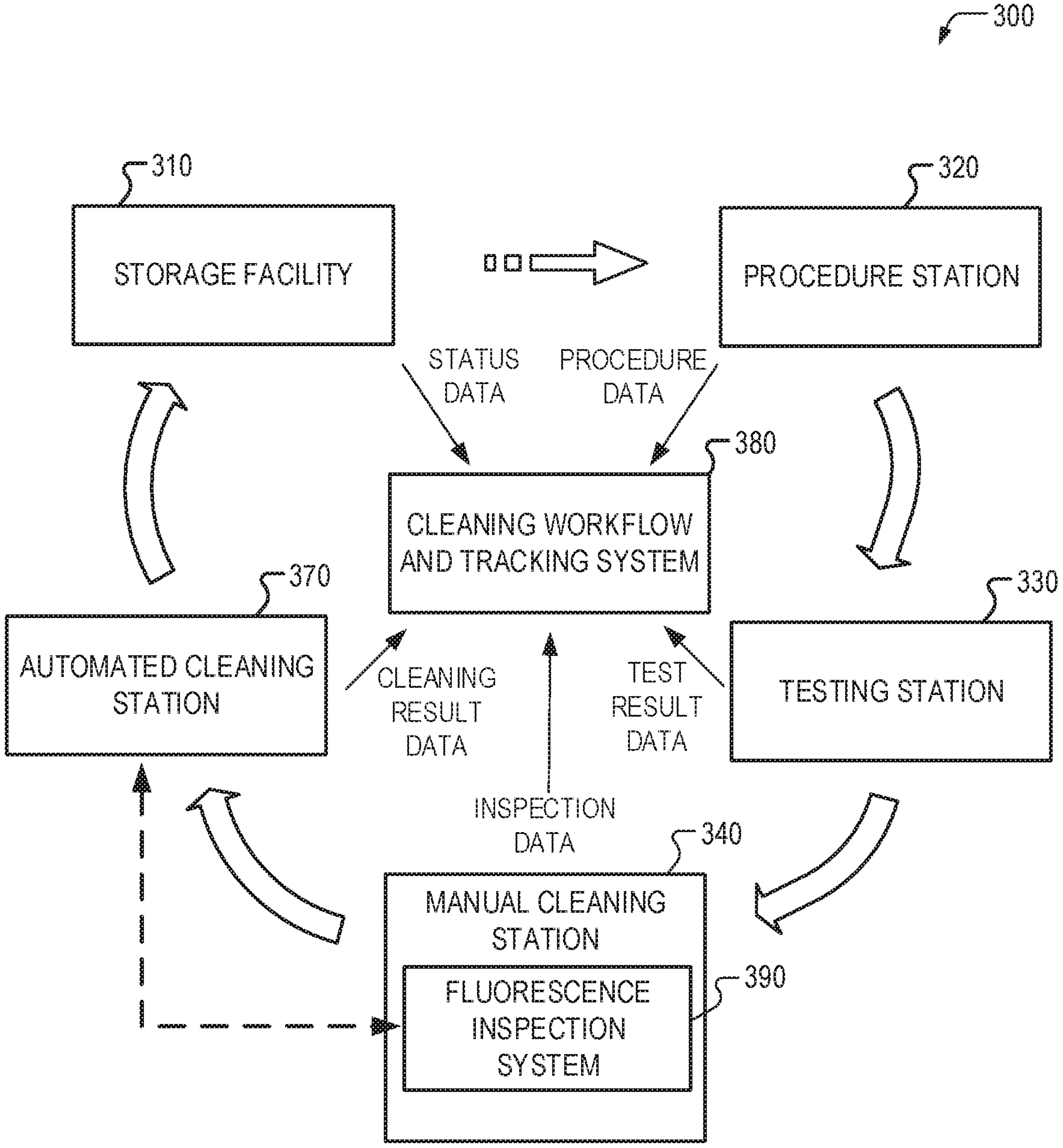
FIG. 3 illustrates data flows provided with a cleaning workflow and tracking system, during respective stages of endoscope use and processing, according to various examples discussed herein.

FIG. 3 illustrates data flows 300 provided with an example cleaning workflow and tracking system 380, during respective stages of endoscope use and processing, including the use of a fluorescence inspection system 390 used to perform an integrity verification of one or more endoscope channels or surfaces. Other types of inspection and cleaning systems, such as a borescope inspection system and visual inspection processing system, are not illustrated but may also be integrated as part of the data flows 300.

The data flows 300 illustrate the generation and communication of data as an endoscope is handled or used at various locations. These include: status of the endoscope at a storage facility 310 (e.g., the storage unit 152 in the storage stage 150), as indicated via status data (e.g., a location and sterilization status of the endoscope); status of the use of the endoscope at a procedure station 320 (e.g., as handled in the procedure use stage 110), as indicated via procedure data (e.g., an identification of a patient, physician, and handling details during the procedure); status of the testing of the endoscope at a testing station 330 (e.g., at a leak or component test device), as indicated via test result data (e.g., a pass or fail status of a test, measurement values, etc.); status of the manual cleaning actions performed at a manual cleaning station 340 (e.g., as performed by the technician 122), as indicated by inspection data (e.g., a status that logs the timing and result of inspection procedures, cleaning activities, etc.); and a status of the machine cleaning actions performed at an automated cleaning station 370 (e.g., as performed by the AER 124), as indicated by cleaning result data (e.g., a status that logs the procedures, chemicals, timing of automated reprocessing activities). Such statuses and data may be communicated for storage, tracking, maintenance, and processing, at a cleaning workflow and tracking system 380 (and databases operated with the system 380).

The location of the endoscope among the stations, and activities performed with the endoscope, may be performed in connection with a specific device handling workflow. Such a workflow may include a step-by-step cleaning procedure, maintenance procedures, or a tracking workflow, to track and manage a disinfected or contaminated status, operational or integrity status, or cleaning procedure status of the endoscope components or related equipment. In connection with cleaning operations at the manual cleaning station 340 or the automated cleaning station 370, the subject endoscope may be identified using a tracking identifier unique to the endoscope, such as a barcode, RFID tag, or other identifier coupled to or communicated from the endoscope. For instance, fluorescence inspection system 390 may host an identifier detector to receive identification of the particular endoscope being cleaned at the respective cleaning station. In an example, the identifier detector comprises a RFID interrogator or bar code reader used to perform hands-free identification.

Additionally, in connection with a cleaning workflow, tracking workflow, or other suitable device handling workflow, a user interface may be output to a human user via a user interface device (e.g., a display screen, audio device, or combination). For example, the user interface may request input from the human user to verify whether a particular cleaning protocol has been followed by the human user at each of the testing station 330, manual cleaning station 340 and automated cleaning station 370. A user interface may also output or receive modification of the status in connection with actions at the storage facility 310 and the procedure station 320. The input to such user interface may include any number of touch or touch-free (e.g., gesture, audio command, visual recognition) inputs, such as with the use of touchless inputs to prevent contamination with an input device.

In various examples, input recognition used for control or identification purposes may be provided within logic or devices of any of the stations 310, 320, 330, 340, 370. In still further examples, tracking of patients, cleaning personnel, technicians, and users or handlers of the endoscope may be tracked within the data values communicated to the cleaning workflow and tracking system 380. The interaction with the cleaning workflow and tracking system 380 may also include authentication and logging of user identification information, including validation of authorized users to handle the device, or aspects of user-secure processing.

A variety of inquiries, prompts, or collections of data may occur at various points in a device cleaning or handling workflow, managed by the cleaning workflow and tracking system 380, to collect and output relevant data. Such data may be managed for procedure validation or quality assurance purposes, for example, to obtain human verification that a cleaning process has followed proper protocols, or that human oversight of the cleaning process has resulted in a satisfactory result. Workflow steps may also be required by the workflow and tracking system 380 to be performed in a determined order to ensure proper cleaning, and user inquiries and prompts may be presented in a determined order to collect full information regarding compliance or procedure activities. Further, the cleaning workflow and tracking system 380 may be used to generate an alert or display appropriate prompts or information if a user or device does not fully completion certain steps or procedures.

Figure 4:
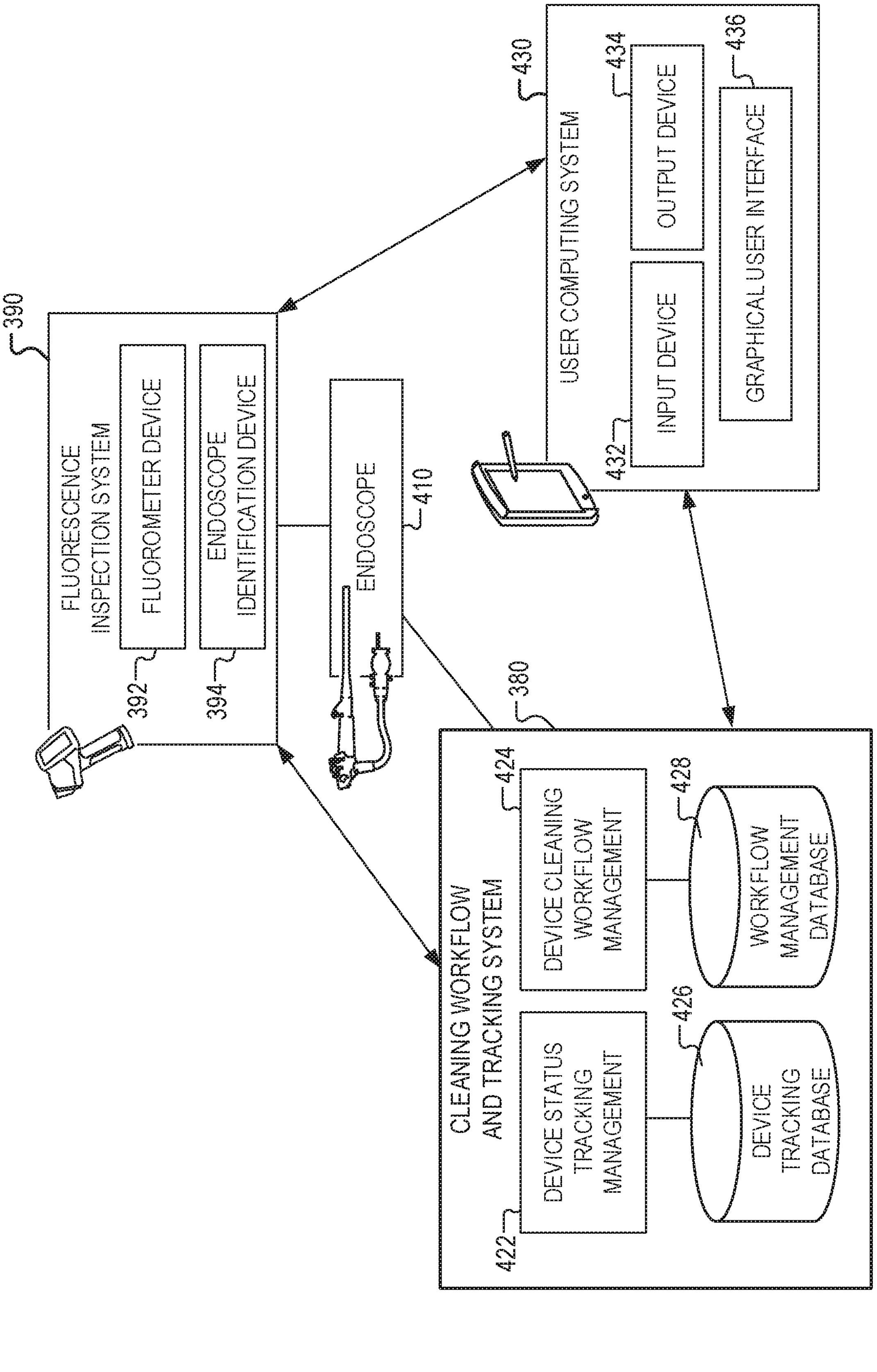
FIG. 4 is a block diagram of system components used to interface among cleaning, disinfecting, inspection, tracking, and processing systems according to various examples discussed herein.

FIG. 4 is a block diagram of system components used to interface among example imaging, tracking, and processing systems. As shown, the components of the fluorescence inspection system 390 may include a fluorometer device 392 and an endoscope identification device 394. The fluorometer device 392 may determine and provide a status of detection of fluorescence (e.g., a detection of fluorescing biological materials) as an output from the system 390 or as a value provided to the cleaning workflow and tracking system 380. This status of detection may be determined from and tracked for the inspection of subject areas (e.g., internal channels, external surfaces) of the endoscope 410 or a component of the endoscope 410. The use of the fluorescence inspection system 390 may be tracked and managed as part of an inspection procedure in a cleaning workflow, with resulting tracking and inspection data maintained by the cleaning workflow and tracking system 380.

The cleaning workflow and tracking system 380 may include functionality and processing components used in connection with a variety of cleaning and tracking purposes involving the endoscope 410. Such components may include device status tracking management functionality 422 that utilizes a device tracking database 426 to manage data related to status(es) of contamination, damage, tests, and usage for the endoscope 410 (e.g., among any of the stages 110, 120, 140, 150). Such components may also include a device cleaning workflow management functionality 424 used to track cleaning, testing, verification activities, initiated as part of a cleaning workflow for the endoscope 410 (e.g., among the reprocessing stages 120, 140). As specific examples, the workflow management database 428 may log the timing and performance of specific manual or automatic cleaning actions, the particular amount or type of cleaning or disinfectant solution applied, which user performed the cleaning action, and the like.

The data and workflow actions in the cleaning workflow and tracking system 380 may be accessed (e.g., viewed, updated, input, or output) through use of a user computing system 430, such as with an input device 432 and output device of a personal computer, tablet, workstation, or smartphone, operated by an authorized user. The user computing system 430 may include a graphical user interface 436 to allow access to the data and workflow actions before, during, or after any of the handling or cleaning stages for the endoscope 410 (e.g., among any of the stages 110, 120, 140, 150). For instance, the user computing system 430 may display a real-time status of whether the endoscope 410 is disinfected, which tests have been completed and passed during cleaning, and the like. Additionally, the user computing system 430 may communicate data directly or indirectly with the fluorescence inspection system 390, including in scenarios where the fluorescence inspection system 390 is used independently of the cleaning workflow and tracking system.

Although many of the preceding examples were provided with reference to endoscope processing and similar medical device cleaning settings, it will be understood that a variety of other uses may be applied in both medical and non-medical settings to identify, prevent, or reduce the potential of contamination. These settings may include the handling of hazardous materials in a various of scientific and industrial settings, such as the handling of objects contaminated with chemical, biological or radioactive agents, particularly amine-containing agents; the human control of systems and devices configured to process and clean potentially contaminated objects; and other settings involving a contaminated object or human. Likewise, the preceding examples may also be applicable in clean room settings where the environment or particular objects are intended to remain in a clean state, and where human contact with substances or objects may cause contamination that is tracked and remediated.

Composition for Cleaning and Assessing Cleanliness.

The present disclosure provides a composition useful for cleaning medical devices and also for assessing the cleanliness of the medical devices. The composition can be used during or after any of the cleaning, disinfecting, rinsing cycles of endoscope reprocessing and, in various examples, the composition can monitor and report the extent of the cleaning, disinfecting or rinsing, or can signal when cleaning, disinfecting or rising is sufficient or complete. For example, the composition can be used to assess cleanliness by detecting the concentration of residual protein after the manual washing cycle of a medical device such as an endoscope.

The composition contains ortho-phthalaldehyde and has a pH of about 9.0 to about 13.0. In various embodiments, the composition contains ortho-phthalaldehyde and has a pH of about 9.0 to about 12.5. Without being limited to theory or mechanism, ortho-phthalaldehyde can interact with the amines in proteins, peptides, amino acids and other biological molecules to generate a species which readily fluoresces (emission wavelength at about 400-475 nm) upon excitation (excitation wavelength at about 300-390 nm). Thus, in various examples, the composition can be used to fluorescently detect the presence of biological material, such as proteins, peptides and amino acids.

The ortho-phthalaldehyde can be least or about 0.05 wt %, 0.10 wt %, 0.15 wt %, 0.20 wt %, 0.25 wt %, 0.30 wt %, 0.35 wt %, 0.40 wt %, 0.45 wt %, 0.50 wt %, 0.51 wt %, 0.52 wt %, 0.53 wt %, 0.54 wt %, 0.55 wt %, 0.56 wt %, 0.57 wt %, 0.58 wt %, 0.59 wt %, 0.60 wt %, 0.65 wt %, 0.70 wt %, 0.75 wt %, 0.80 wt %, 0.85 wt %, 0.90 wt %, 0.95 wt %, 1.00 wt %, 1.25 wt %, 1.50 wt %, 1.75 wt %, 2.00 wt %, 2.50 wt %, 3.00 wt %, 3.50 wt %, 4.00 wt %, 4.50 wt %, 5.00 wt %, 5.50 wt %, 6.00 wt %, 6.50 wt %, 7.00 wt %, 7.50 wt %, 8.00 wt %, 8.50 wt %, 9.00 wt % or at least or about 10.00 wt % of the composition. In various examples, the ortho-phthalaldehyde is less than about 1.00%, 2.00%, 3.00%, 4.00%, 5.00%, 6.00%, 7.00%, 8.00%, 9.00% or less than 10.00%. The ortho-phthalaldehyde can be 0.35 wt % to about 1.00 wt % of the composition and the ortho-phthalaldehyde can be about 0.5 wt % of the composition.

The composition can be a water-based composition. The water can be, for example, deionized water, demineralized water, reverse osmosis water, potable water, sterile water, or water obtained from a tap.

In various examples, the composition further contains one or more of glycol, surfactant, a buffer system.

The composition can contain one or more glycol. Said glycol can be ethylene glycol or propylene glycol or a mixture of both. In various examples, the propylene glycol is alpha-propylene glycol (propane-1,2-diol), beta-propylene glycol, or a mixture of both. The glycol can be about 0.10 wt % to about 20.0 wt %, about 1.0 wt % to about 20.0 wt %, about 1.0 wt % to about 10.0 wt, or about 2.0 wt % to about 7.0 wt % of the composition. The glycol can be about 1.0 wt %, 2.0 wt %, 3.0 wt %, 4.0 wt %, 5.0 wt %, 6.0 wt %, 7.0 wt %, 8.0 wt %, 9.0 wt %, 10.0 wt %, 11.0 wt %, 12.0 wt %, 13.0 wt %, 14.0 wt %, 15.0 wt %, 16.0 wt %, 17.0 wt %, 18.0 wt %, 19.0 wt %, or 20.0 wt % of the composition.

The composition can contain one or more alcohol. An example alcohol is ethanol. Suitable alcohols include other straight chain $C_1$-$C_{20}$ alcohols. The alcohol can be about 0.10 wt % to about 20.0 wt %, about 1.0 wt % to about 20.0 wt %, about 1.0 wt % to about 10.0 wt, or about 2.0 wt % to about 7.0 wt % of the composition. The alcohol can be about 1.0 wt %, 2.0 wt %, 3.0 wt %, 4.0 wt %, 5.0 wt %, 6.0 wt %, 7.0 wt %, 8.0 wt %, 9.0 wt %, 10.0 wt %, 11.0 wt %, 12.0 wt %, 13.0 wt %, 14.0 wt %, 15.0 wt %, 16.0 wt %, 17.0 wt %, 18.0 wt %, 19.0 wt %, or 20.0 wt % of the composition.

The composition can contain one or more surfactant. The surfactant can be one or more non-ionic, cationic or anionic surfactant. In an example, the surfactant comprises, or consists of, one or more non-ionic surfactant. In various examples, the surfactant comprises one or more ethoxylated alcohol such as C9-C11 ethoxylated alcohols. The surfactant can be about 0.05 wt % to about 20.0 wt %, 0.10 wt % to about 20.0 wt %, about 1.0 wt % to about 20.0 wt %, 0.05 wt % to about 10.0 wt %, about 1.0 wt % to about 10.0 wt %, or about 2.0 wt % to about 7.0 wt % of the composition. The surfactant can be about 1.0 wt %, 2.0 wt %, 3.0 wt %, 4.0 wt %, 5.0 wt %, 6.0 wt %, 7.0 wt %, 8.0 wt %, 9.0 wt %, 10.0 wt %, 11.0 wt %, 12.0 wt %, 13.0 wt %, 14.0 wt %, 15.0 wt %, 16.0 wt %, 17.0 wt %, 18.0 wt %, 19.0 wt %, or 20.0 wt % of the composition.

The composition can contain one or more ethoxylated alcohol, such as C9-C11 ethoxylated alcohols. The one or more ethoxylated alcohol can comprise or consist of C9-C11 ethoxylated alcohols. In various examples, about 0.05 wt % to about 20.0 wt %, 0.10 wt % to about 20.0 wt %, about 1.0 wt % to about 20.0 wt %, 0.05 wt % to about 10.0 wt %, about 1.0 wt % to about 10.0 wt %, or about 2.0 wt % to about 7.0 wt % of the composition is C9-C11 ethoxylated alcohol.

The composition can contain a buffer system. An example buffer system is a mixture of potassium phosphate dibasic and sodium hydroxide. The buffer system can be configured to maintain a pH of about 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9 or about 13.0. The buffer system can be configured to result in a pH of greater than 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, or greater than 13.0. The pH can be, for example, about 9.0 to about 13, 9.0 to 13, 9.5 to 12.5, 9.0 to about 13, or about 9.5 to 12.5.

The composition can contain one or more glycol ether. The glycol ether can comprise or consist of diethylene glycol monoethyl ether. The glycol ether can be about 0.05 wt % to about 10.0 wt %, 0.10 wt % to about 10.0 wt %, about 1.0 wt % to about 10.0 wt %, 0.05 wt % to about 7.5 wt %, about 1.0 wt % to about 7.5 wt %, or about 2.0 wt % to about 5.0 wt % of the composition. The glycol ether can be about 1.0 wt %, 2.0 wt %, 3.0 wt %, 4.0 wt %, 5.0 wt %, 6.0 wt %, 7.0 wt %, 8.0 wt %, 9.0 wt % or about 10.0 wt % of the composition.

The composition can contain one or more Arrhenius base or inorganic base which provides a source of hydroxide. The base can be lithium hydroxide, sodium hydroxide, potassium hydroxide, cesium hydroxide, magnesium hydroxide, or calcium hydroxide. In various examples, the composition contains sodium hydroxide. The base can be about 0.05 wt % to about 10.0 wt %, 0.10 wt % to about 10.0 wt %, about 1.0 wt % to about 10.0 wt %, 0.05 wt % to about 7.5 wt %, about 1.0 wt % to about 7.5 wt %, or about 2.0 wt % to about 5.0 wt % of the composition. The base can be about 1.0 wt %, 2.0 wt %, 3.0 wt %, 4.0 wt %, 5.0 wt %, 6.0 wt %, 7.0 wt %, 8.0 wt %, 9.0 wt % or about 10.0 wt % of the composition.

The composition can contain one or more chelator. An example chelator is the chelator is ethylenediaminetetraacetic acid (EDTA). In various examples, the one or more chelator is about 0.01 wt % to about 2 wt % of the composition, 0.01 wt % to about 1.0 wt % of the composition, 0.1 wt % to about 2 wt % of the composition, 0.5 wt % to about 1.5 wt % of the composition, or 1.0 wt % to about 2 wt % of the composition.

The composition can contain one or more corrosion inhibitor. Example corrosion inhibitors are benzotriazole or sodium dodecyl sulfate. In various examples, the one or more corrosion inhibitor is about 0.01 wt % to about 2 wt % of the composition, 0.01 wt % to about 1.0 wt % of the composition, 0.1 wt % to about 2 wt % of the composition, 0.5 wt % to about 1.5 wt % of the composition, or 1.0 wt % to about 2 wt % of the composition.

The composition can contain one or more antifoaming agent. Example antifoaming agents are polyoxypropylene-polyoxyethylene block copolymers, such as Pluronic® 10R5 having the CAS Reg. No. 9003-11-6. In various examples, the one or more antifoaming agent is about 0.01 wt % to about 2 wt % of the composition, 0.01 wt % to about 1.0 wt % of the composition, 0.1 wt % to about 2 wt % of the composition, 0.5 wt % to about 1.5 wt % of the composition, or 1.0 wt % to about 2 wt % of the composition.

In various examples, the liquid is at room temperature.

In one example, the composition comprises:
ortho-phthalaldehyde which is 0.35 wt % to about 1.00 wt % of the composition, propylene glycol which is about 0.10 wt % to about 20.0 wt % of the composition, C9-C11 ethoxylated alcohols which are about 0.05 wt % to about 10 wt % of the composition, ethylenediaminetetraacetic acid which is about 0.01 wt % to about 2 wt % of the composition, phosphate buffer, sodium hydroxide, and water; and the composition is in liquid form and has a pH of about 9.0 to about 13.0.

The present disclosure also provides a composition prepared by mixing a detergent having a pH of about 9.0 to about 13.0 together with a high-level disinfectant comprising ortho-phthalaldehyde. The resulting composition can be used for cleaning, assessing cleanliness, or both. The present disclosure also provides a method of preparing such a composition.

The detergent can include one or more of a chelator, a buffer system, a cleaning agent, a solubilizer, and water. In various examples, the detergent includes (i) a chelator such as ethylenediaminetetraacetic acid (EDTA), present in about 1.0 wt. % of the detergent; (ii) a buffer system that includes potassium phosphate dibasic and sodium hydroxide, present in about 14.2 wt. % and 2.16 wt. %, respectively, of the detergent; (iii) a cleaning agent such as diethyl glycol monoethyl ether, present in about 5.0 wt. % of the detergent; (iv) a solubilizer such as propylene glycol, present in about 10.0 wt. % of the detergent; and (v) diluent such as water, present in about 67.64 wt. % of the composition; wherein the detergent has a pH of about 11.9 to about 12.2. In various embodiments, the detergent is Intercept® Plus detergent.

The high-level disinfectant can include ortho-phthalaldehyde at about 1.0 wt % of the disinfectant. The high-level disinfectant comprises C9-C11 ethoxylated alcohols at about 0.05 wt % to about 20 wt % of the composition. In various embodiments, the high-level disinfectant is Rapicide® OPA/28 disinfectant. The present disclosure also provides a composition which is a mixture of Intercept® Plus detergent and Rapicide® OPA/28 disinfectant, each at 0.5% of concentrate solution.

In various examples, the composition is stable under normal storage conditions.

Method of Cleaning and Assessing Cleanliness.

The present disclosure provides a method of cleaning a medical device. The method involves contacting the medical device with any of the compositions described herein for a period of time effective to clean the medical device. Such cleaning compositions can provide fast-acting cleaning. For example, the medical device can be cleaned after being contacted with the cleaning composition for less than 60 minutes, 50 minutes, 40 minutes, 30 minutes, 20 minutes, 10 minutes, 9 minutes, 8 minutes, 7 minutes, 6 minutes, 5 minutes, 4 minutes, 3 minutes, 2 minutes, 1 minute, 55 seconds, 50 seconds, 45 seconds, 40 seconds, 35 seconds, 30 seconds, 25 seconds, 20 seconds, 15 seconds or less than 10 seconds. In various examples, the resulting cleaned medical device has a residual protein level on the surface of less than or equal to 6.4 ug/cm$^2$. In various further examples, the resulting cleaned medical device has a residual protein level on the surface of less than, equal to, or about 0.1 ug/cm$^2$, 0.09 ug/cm$^2$, 0.08 ug/cm$^2$, 0.07 ug/cm$^2$, 0.06 ug/cm$^2$ or 0.05 ug/cm$^2$.

The medical device can be treated with a cleaning composition which is at a temperature of about 20° C. to about 40° C. or at room temperature. For example, the cleaning composition can be at 25° C. In various examples, the cleaning composition is at the ambient temperature of the room where the medical device is being treated.

The method can further involve shining an excitation light on the cleaning composition and measuring intensity of the fluorescence of the cleaning composition. The excitation light can be broad spectrum or narrow, but in various examples includes light having a wavelength in the range of about 300 to about 390 nm. As another example, the excitation light can be 330 to about 390 nm. The intensity of the resulting fluorescent emissions is measured at a wavelength in the range of about 400 to about 475 nm. As another example, the resulting fluorescent emissions can be 400 to about 475 nm. For example, the excitation wavelength can about 300 nm, 310 nm, 320 nm, 330 nm, 340 nm, 350 nm, 360 nm, 370 nm, 380 nm, or 390 nm. The emission wavelength can be, for example, any integer between about 436 to about 475 nm, as can be the monitored wavelength. In various examples, the monitored wavelength is the peak wavelength in the range of about 436 to about 475 nm.

The intensity of fluorescence can be monitored to assess the extent of cleaning. For example, cleaning is sufficient or substantially complete when the fluorescence shows a substantially steady state of intensity, e.g., steady over a period of at least 10, 20, 30, 40, 50, 60 seconds. Typically, fluorescence will reach a steady state within 120 seconds, 110 seconds, 100 seconds, 90 seconds, 80 seconds, 70 seconds, 60 seconds, 50 seconds, 40 seconds or 30 seconds.

The present disclosure also provides a method of assessing the cleanliness of a medical device. The method involves contacting the medical device with any of the compositions described herein, shining an excitation light on the composition and measuring the signal emitted from the composition, sustaining contact between the medical device and the composition until the composition shows a substantially steady state of intensity of fluorescence, and then removing the composition from contact with the medical device.

The method can further comprises rinsing the medical device with water, shining the excitation light on the water used for rinsing and measuring the signal emitted from the water, and continuing to rinse the medical device with water until the water shows a measurement substantially equal to a baseline measurement for water.

The method can further comprise first mixing a detergent having a pH of about 9.0 to about 13.0 together with a high-level disinfectant comprising ortho-phthalaldehyde to provide the composition used in the aforementioned method.

In various examples, the method can involve use of a composition having a pH of about 9.0 to about 13.0 and comprising ortho-phthalaldehyde, propylene glycol, and a non-ionic surfactant.

When assessing cleanliness by monitoring fluorescence, the excitation light can be broad spectrum or narrow, but in various examples includes light having a wavelength in the range of about 300 to about 390 nm. The intensity of the resulting fluorescent emissions is measured at a wavelength in the range of about 436 to about 475 nm. For example, the excitation wavelength can about 330 nm, 340 nm, 350 nm, 360 nm, 370 nm, 380 nm, or 390 nm. The emission wavelength can be, for example, any integer between about 400 to about 475 nm, as can be the monitored wavelength. In various examples, the monitored wavelength is the peak wavelength in the range of about 436 to about 475 nm.

The intensity of fluorescence can be monitored to assess the extent of cleaning. For example, the medical device can be understood to be sufficiently clean when the fluorescence intensity shows a substantially steady state of intensity, e.g., steady over a period of at least 10, 20, 30, 40, 50, 60 seconds. Typically, fluorescence will reach a steady state within 120 seconds, 110 seconds, 100 seconds, 90 seconds, 80 seconds, 70 seconds, 60 seconds, 50 seconds, 40 seconds or 30 seconds. In various such examples, the medical device is contacted with the composition at 20° C. to about 40° C. In various examples, the method can detect protein at a sensitivity of about 0.5 ppm to about 40 ppm.

The methods of cleaning and assessing cleanliness can, for example, be performed after manual washing prior to treatment with an automatic reprocessor.

In various examples, contacting the medical device with the composition is performed by immersing the medical device in a bath of the composition, which may be, for example, at 20° C. to about 40° C., or room temperature.

In various examples, contacting the medical device with a cleaning composition comprises flushing the composition through an interior area of the medical device. The interior area can be defined by one or more cavity, lumen, or channel. Flushing can be performed with the assistance of a flushing aid machine such as a Scope Buddy® Endoscope Flushing Aid. The flushing aid machine can be equipped with a spectrometer, a luminometer, a photometer, a fluorometer, a light source which emits light at a wavelength of 300-390 nm, a sensor which detects light at a wavelength of 400-475, or a combination thereof.

In various examples, sustaining contact comprises collecting and recirculating the flushed cleaning composition through the medical device with the assistance of a flushing aid machine, such as a Scope Buddy® configured to recirculate fluids.

In various examples, the medical device is contacted with the cleaning composition in a sterilization machine, medical device cleaning machine, or automated endoscope reprocessor. The automated endoscope reprocessor can be equipped with a spectrometer, a luminometer, a photometer, a fluorometer, a light source which emits light at a wavelength of 300-390 nm, a sensor which detects light at a wavelength of 400-475, or a combination thereof.

In various example, the medical device is a rigid endoscope or a flexible endoscope.

The present disclosure also provides a kit which includes a detergent having a pH of about 9.0 to about 13.0 in a first container, a high-level disinfectant comprising ortho-phthalaldehyde in a second container, and printed indicia including instructions to combine the detergent with the high-level disinfectant.

EXPERIMENTAL EXAMPLES

Various aspects of the present disclosure can be better understood by reference to the following Experimental Examples which are offered by way of illustration. The present disclosure is not limited to the Experimental Examples given herein.

TABLE 1

| Materials |
|---|
| Teflon tubing |
| Edinburg modified soil (50 g dry milk, 25 mL 1% Nigrosine, 30 mL Horse Serum, 10 mL sheep blood, 20 mL DI water). |
| Scope Buddy ® |
| Rapicide ® OPA/28 disinfectant |
| Intercept ® Plus detergent |
| Glomax ® Multi Jr Detection System: Luminometer, and Fluorescence Optical Kit (excitation 365 nm, emission 410-450 nm) |
| Water bath |

First, Teflon tubing was inoculated with Edinburg modified soil. One end of the tubing was immersed in the soil container and the test soil was drawn up through the entire length of the channel using a 60 mL syringe. The resulting soiled tubing was allowed to dry for more than an hour. After one-hour, excess soil was purged using air. The soiled tubing simulates an endoscope. Three simulated scopes were prepared.

A 1% Rapicide® OPA/28 solution was prepared and placed in a water bath at 40° C. A 1% Intercept® Plus solution was prepared and placed in a water bath at 40° C. A 500 mL cleaning composition was prepared by combining 250 mL of the 1% Rapicide® OPA/28 solution and 250 mL of the 1% Intercept® Plus solution, the resulting cleaning composition was maintained at 40° C.

Baseline fluorescence measurements were taken of each of the cleaning solution and deionized (DI) water.

A Scope Buddy® Flushing Aid was outfitted with the Glomax® Multi Jr Detection System, along with a Luminometer and the Fluorescence Optical Kit (configured for excitation at 365 nm, and emission detection at 410-450 nm)

Figure 5:
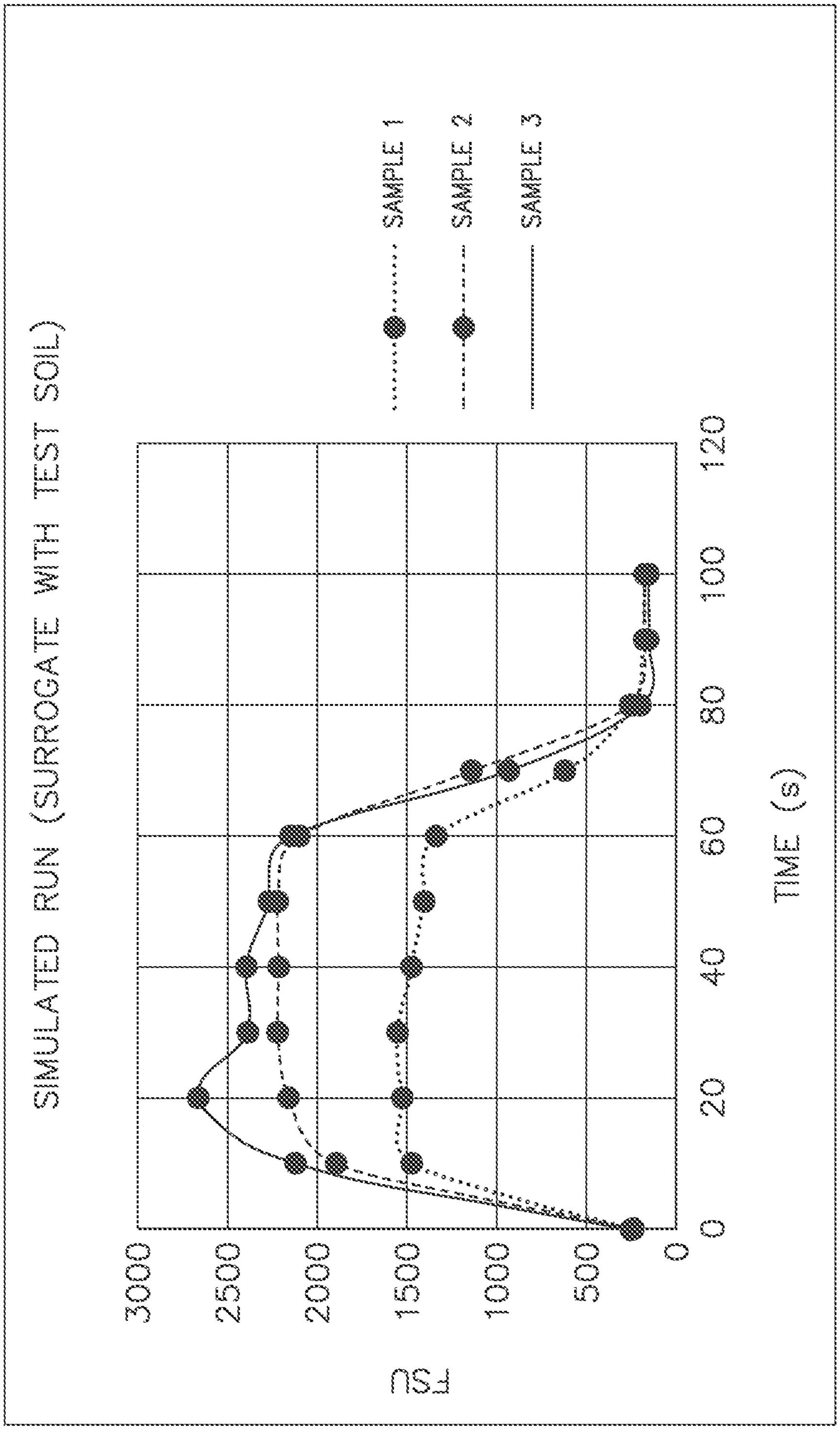
FIG. 5 shows real-time detection of a residual protein using the composition of the present disclosure.

Performed a wash cycle using the prepared cleaning composition using the modified Scope Buddy® to circulate the cleaning composition through the soiled tubing. Fluorescence measurements were taken every 10 seconds for up to one minute, or until fluorescence reading reaches a plateau, i.e., a steady state. The wash cycle was repeated three times, results are shown in FIG. 5 and Table 2. The detection cycle begins from 0 to 10 seconds, 10 seconds to 70 seconds indicated soil presence, and 70 seconds to 100 seconds corresponds to end of detection/return to cycle. At 60 seconds, it was determined that the fluorescence reading reached a plateau and the cleaning composition was replaced with DI water.

TABLE 2

| | Time (s) | | | | | |
|---|---|---|---|---|---|---|
| | 0 | 10 | 20 | 30 | 40 | 50 |
| 1 | 244 | 1470 | 1522 | 1551 | 1473 | 1402 |
| 2 | 232 | 1888 | 2156 | 2219 | 2212 | 2217 |
| 3 | 248 | 2120 | 2663 | 2389 | 2395 | 2271 |

| | Time (s) | | | | | Water |
|---|---|---|---|---|---|---|
| | 60 | 70 | 80 | 90 | 100 | Blank |
| 1 | 1336 | 616 | 250 | 174 | 164 | 161 |
| 2 | 2096 | 1138 | 259 | 173 | 176 | 200 |
| 3 | 2156 | 930 | 196 | 150 | 149 | 149 |

Next, a rinse cycle was performed using clean DI water to flush the cleaning composition out of the tubing. Fluorescence measurements were taken every 10 seconds for up to 30 seconds, or until fluorescence reading became equal to the baseline DI water fluorescence measurement.

The residual soil in tubing was recovered using 10 mL of DI water and a flush, brush, flush method (3 flushes, 1 brush, 3 flushes). The protein of these samples was analyzed by using BCA and using the prepared cleaning composition. Residual surface protein was calculated by comparing the amount of analyzed protein to the surface area of the tubing. This final step validates the new cleaning composition against a BCA protein detection. The results show that the cleaning composition prepared from Rapicide® OPA/28 and Intercept® Plus provide highly sensitive, quantitative detection of residual protein. See, results in Table 3 below.

Calibration curves were prepared for the Rapicide® OPA/28 and Intercept® Plus method and for the microBCA method. Protein (BSA) standards were prepared at 0, 0.5, 1, 2.5, 5, 10, 20, 40 and 200 ppm.

Working microBCA reagent was prepared by mixing 25 mL of microBCA Reagent A, with 24 mL of microBCA Reagent B and 1 mL of microBCA Reagent C. Calibration was prepared using 1 ml of standards+1 ml of working reagent/1 ml of samples+1 ml of working reagent, at a 60° C. water bath for 60 minutes. Samples were then cooled to room temperature and measured at 562 nm.

Working Rapicide® OPA/28 and Intercept® Plus reagent was prepared by mixing 1% Rapicide® OPA/28 and 1% Intercept® Plus. Calibration was prepared using 1 ml of standards+1 ml of working reagent/1 ml of samples+1 ml of working reagent, at room temperature and samples were measured within 30 seconds at 460 nm.

Figure 6:
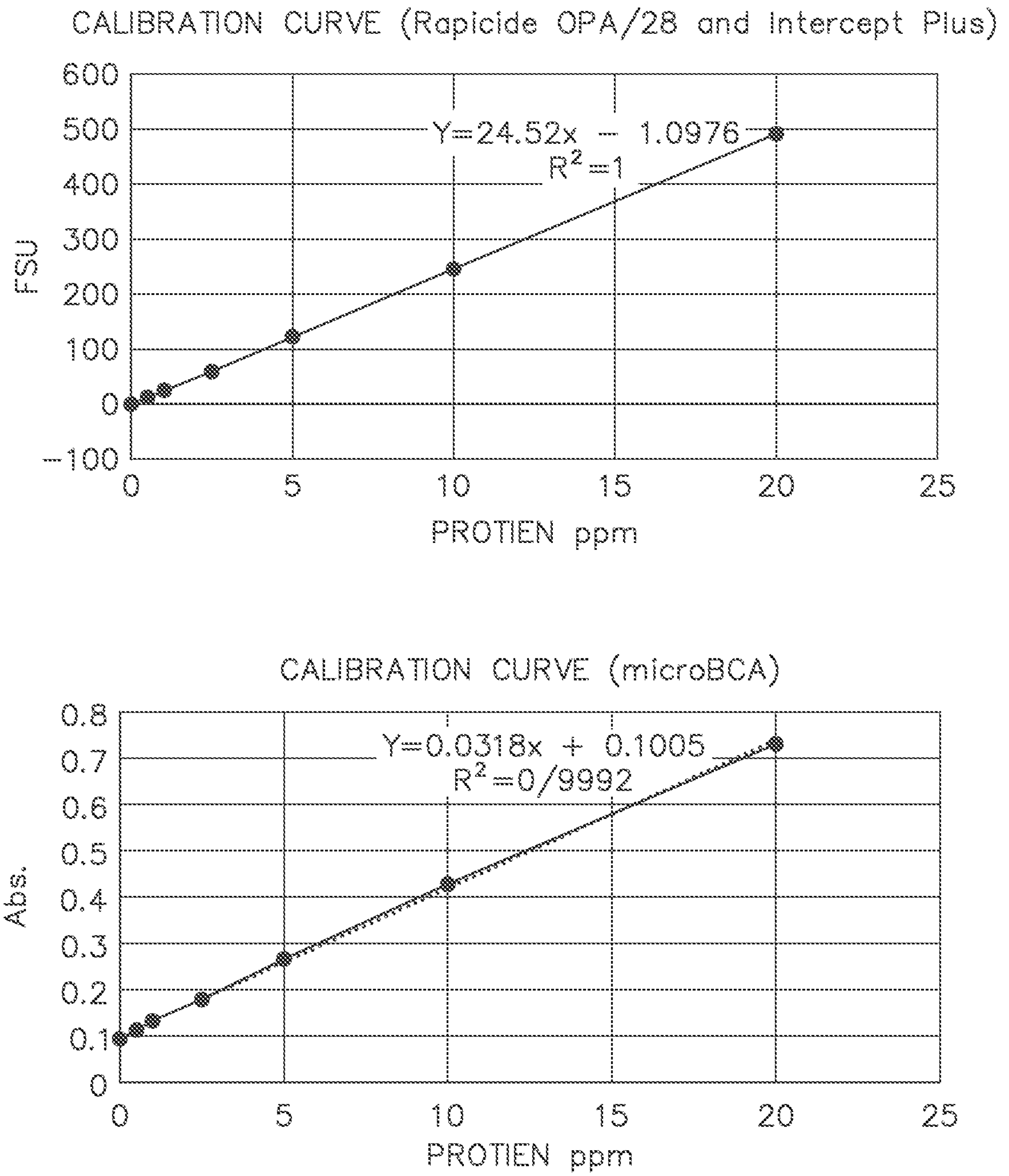
FIG. 6 shows calibration curves for a microBCA and a composition comprising Intercept® Plus detergent and Rapicide® OPA/28 disinfectant.

The microBCA method requires 60° C. and 1 hour to provide protein detection. In contrast, the Rapicide® OPA/28 and Intercept® Plus method provided a fluorescence reading at 30 seconds or less, which is effective real-time. Calibration curves are provided in FIG. 6

The residual protein in a simulated scope after a cleaning cycle were analyzed by both a standard micro BCA method and method using the cleaning composition prepared from Rapicide® OPA/28 and Intercept® Plus. Results, in triplicate, comparing the Rapicide® OPA/28 and Intercept® Plus method against a standard microBCA method are provided in Table 3. The results show that the prepared composition is sensitive for low levels of protein.

TABLE 3

| | Protein Concentration (ppm in 10 ml DI) | | |
|---|---|---|---|
| Method | Tubing 1 | Tubing 2 | Tubing 3 |
| Intercept ® Plus and Rapicide ® OPA/28 | 0.72 | 1.96 | 3.75 |
| microBCA | 0.58 | 1.62 | 2.39 |

Overall, the combined mixture of Rapicide® OPA/28 and Intercept® Plus is a promising composition for both cleaning and detection of surface soiling. The combined composition offers greatly improved speed of protein detection thus offering the option of real-time detection during cleaning and inspection stages of endoscope reprocessing. The result suggests that the combined mixture of Rapicide® OPA/28 and Intercept® Plus may have a higher sensitivity than the microBCA test (0.5 ppm). The new cleaning composition also has the advantage of requiring less prep time than microBCA. Most importantly, the results validate that a Rapicide® OPA/28 and Intercept® Plus are materially compatible and result in a stable composition which have a protein detection function that offer a substantial improvement in speed and ease-of-use and potentially greater sensitivity to residual protein compared to the conventional microBCA method.

The residual protein in surface of the simulated scope was calculated. The flush brush flush method was employed, and recovery volume was 10 ml of DI water. The tubing had a length of 63.5 cm and a diameter of 0.6 cm, thus providing an approximate surface area of the channel of 119.69 $cm^2$. The calculated level of residual protein is within the level deemed acceptable by the FDA (≤6.4 ug/cm2). The results, which are provided in Table 4, show that the combination of Rapicide® OPA/28 and Intercept® Plus is excellent at removing residual protein, and is a suitable composition for cleaning medical devices including endoscopes.

TABLE 4

| | Protein Concentration (ug/$cm^2$) | | |
|---|---|---|---|
| Method | Sample 1 | Sample 2 | Sample 3 |
| Intercept ® Plus and Rapicide ® OPA/28 | 0.06 | 0.16 | 0.31 |
| microBCA | 0.05 | 0.14 | 0.2 |

Additional examples of the presently described compositions, methods, systems, and kits include the following, non-limiting configurations. Each of the following non-limiting examples may stand on its own, or may be combined in any permutation or combination with any one or more of the other examples provided below or throughout the present disclosure.

Additional Examples

The following exemplary examples are provided, the numbering of which is not to be construed as designating levels of importance:

Example 1 provides a composition, comprising ortho-phthalaldehyde, glycol, surfactant, a buffer system, and water, wherein the composition has a pH of about 9.0 to about 13.0.

Example 2 provides the composition of Example 1, further comprising an Arrhenius base.

Example 3 provides the composition of Example 2, wherein the Arrhenius base is lithium hydroxide, sodium hydroxide, potassium hydroxide, cesium hydroxide, magnesium hydroxide, or calcium hydroxide.

Example 4 provides the composition of any one of Examples 1-3, wherein ortho-phthalaldehyde is at least 0.35 wt % of the composition.

Example 5 provides the composition of any one of Examples 1-4, wherein ortho-phthalaldehyde is 0.35 wt % to about 1.00 wt % of the composition.

Example 6 provides the composition of any one of Examples 1-5, wherein ortho-phthalaldehyde is about 0.5 wt % of the composition.

Example 7 provides the composition of any one of Examples 1-6, wherein the glycol is propylene glycol.

Example 8 provides the composition of any one of Examples 1-7, wherein the glycol is about 0.10 wt % to about 20.0 wt % of the composition.

Example 9 provides the composition of any one of Examples 1-8, wherein the surfactant is about 0.05 wt % to about 20 wt % of the composition.

Example 10 provides the composition of any one of Examples 1-9, wherein the surfactant comprises one or more non-ionic surfactant.

Example 11 provides the composition of any one of Examples 1-10, wherein the surfactant comprises one or more ethoxylated alcohol.

Example 12 provides the composition of any one of Examples 1-11, wherein the surfactant comprises C9-C11 ethoxylated alcohols.

Example 13 provides the composition of any one of Examples 1-12, wherein about 0.05 wt % to about 10 wt % of the composition is C9-C11 ethoxylated alcohol.

Example 14 provides the composition of any one of Examples 1-13, wherein the buffer system is a mixture of potassium phosphate dibasic and sodium hydroxide.

Example 15 provides the composition of any one of Examples 1-14, wherein the composition has a pH of at least about 9.0.

Example 16 provides the composition of any one of Examples 1-15, wherein the composition has a pH of about 9.0 to about 13.0.

Example 17 provides the composition of any one of Examples 1-16, further comprising a glycol ether.

Example 18 provides the composition of Example 17, wherein the glycol ether is about 0.05 wt % to about 10 wt % of the composition.

Example 19 provides the composition of Example 17 or 18, wherein the glycol ether is diethylene glycol monoethyl ether.

Example 20 provides the composition of any one of Examples 1-19, further comprising a chelator.

Example 21 provides the composition of any one of Examples 1-20, wherein the chelator is about 0.01 wt % to about 2 wt % of the composition.

Example 22 provides the composition of Example 21, wherein the chelator is ethylenediaminetetraacetic acid.

Example 23 provides the composition of any one of Examples 1-22, further comprising a corrosion inhibitor.

Example 24 provides the composition of Example 23, wherein the corrosion inhibitor is about 0.01 wt % to about 2 wt % of the composition.

Example 25 provides the composition of Example 23 or 24, wherein the corrosion inhibitor is benzotriazole or sodium dodecyl sulfate.

Example 26 provides the composition of any one of Examples 1-25, further comprising an antifoaming agent.

Example 27 provides the composition of Example 26, wherein the antifoaming agent is about 0.01 wt % to about 2 wt % of the composition.

Example 28 provides the composition of Example 26 or 27, wherein the antifoaming agent is a polyoxypropylene-polyoxyethylene block copolymer.

Example 29 provides the composition of any one of Examples 1-28, which is a liquid at room temperature.

Example 30 provides a composition comprising: ortho-phthalaldehyde which is 0.35 wt % to about 1.00 wt % of the composition, propylene glycol which is about 0.10 wt % to about 20.0 wt % of the composition, C9-C11 ethoxylated alcohols which are about 0.05 wt % to about 10 wt % of the composition, ethylenediaminetetraacetic acid which is about 0.01 wt % to about 2 wt % of the composition, phosphate buffer, sodium hydroxide, and water; wherein the composition is in liquid form and has a pH of about 9.0 to about 13.0.

Example 31 provides a method of cleaning a medical device, comprising: mixing a detergent having a pH of about 9.0 to about 13.0 together with a high-level disinfectant comprising ortho-phthalaldehyde to provide a cleaning composition, and contacting the medical device with the cleaning composition for a period of time effective to clean the medical device.

Example 32 provides the composition of Example 31, wherein the period of time effective to clean the medical device is less than 60 minutes.

Example 33 provides the composition of Example 31 or 32, wherein the period of time effective to clean the medical device is less than 1 minute.

Example 34 provides the composition of any one of Examples 31-33, wherein the cleaned medical device has a residual protein level of ≤6.4 $ug/cm^2$.

Example 35 provides the composition of any one of Examples 31-34, wherein the medical device is contacted with the cleaning composition at a temperature of about 20° C. to about 40° C.

Example 36 provides the composition of any one of Examples 1-35, wherein the detergent comprises at least one of propylene glycol and diethylene glycol monoethyl ether.

Example 37 provides the composition of any one of Examples 31-36, wherein the cleaning composition comprises ortho-phthalaldehyde, surfactant, a buffer system, and water, and has a pH of about 9.0 to about 13.0.

Example 38 provides the composition of any one of Examples 31-37, further comprising shining an excitation light on the cleaning composition and measuring the signal emitted from the cleaning composition.

Example 39 provides the composition of Example 38, wherein measuring the signal comprises measuring intensity of fluorescence.

Example 40 provides the composition of Example 38 or 39, wherein measuring the signal comprises measuring a ratio of reference wavelength to a wavelength of interest.

Example 41 provides the composition of any one of Examples 38-40, wherein measuring the signal further comprises analyzing the signal determining the temporal or spatial derivative of the mathematical curve corresponding to the kinetics of the chemical reaction corresponding to fluorescence.

Example 42 provides the composition of any one of Examples 31-38, wherein the period of time effective to clean the medical device is the period of time from contacting the medical device with the cleaning composition until the cleaning composition shows a substantially steady state of intensity of fluorescence for a period of at least 20 seconds.

Example 43 provides the composition of any one of Examples 31-39, wherein the excitation light comprises light having a wavelength of 300-390 nm and the intensity of fluorescence is measured at a wavelength of 400-475 nm.

Example 44 provides a method of assessing the cleanliness of a medical device, comprising: contacting the medical device with a cleaning composition has a pH of about 9.0 to about 13.0 and comprises ortho-phthalaldehyde, shining an excitation light on the cleaning composition and measuring the signal emitted from the cleaning composition, sustaining contact between the medical device and the cleaning composition until the cleaning composition shows a substantially steady state of intensity of fluorescence, and removing the cleaning composition from contact with the medical device.

Example 45 provides the composition of Example 41, further comprising: rinsing the medical device with water, shining the excitation light on the water used for rinsing and measuring the signal emitted from the water, and continuing to rinse the medical device with water until the water shows a measurement substantially equal to a baseline measurement for water.

Example 46 provides the composition of Example 41 or 42, further comprising mixing a detergent having a pH of about 9.0 to about 13.0 together with a high-level disinfectant comprising ortho-phthalaldehyde to provide the cleaning composition.

Example 47 provides the composition of any one of Examples 41-43, wherein the cleaning composition comprises a surfactant.

Example 48 provides the composition of any one of Examples 41-44, wherein the cleaning composition comprises propylene glycol and C9-C11 ethoxylated alcohols.

Example 49 provides the composition of any one of Examples 41-45, wherein the excitation light comprises light having a wavelength of 300-390 nm.

Example 50 provides the composition of any one of Examples 41-46, wherein measuring the signal comprises determining the intensity of fluorescence at a wavelength of 400-475 nm.

Example 51 provides the composition of any one of Examples 41-47, wherein the medical device is contacted with the cleaning composition for a period of less than 60 minutes.

Example 52 provides the composition of any one of Examples 41-48, wherein the medical device is contacted with the cleaning composition for a period of less than 1 minute.

Example 53 provides the composition of any one of Examples 41-49, wherein the medical device is contacted with the cleaning composition at 20° C. to about 40° C.

Example 54 provides the composition of any one of Examples 41-50, wherein the medical device is contacted with the cleaning composition until the cleaning composition shows a substantially steady state of intensity of fluorescence over a period of at least 20 seconds.

Example 55 provides the composition of any one of Examples 31-51, wherein contacting the medical device with a cleaning composition comprises immersing the medical device in a bath of the cleaning composition.

Example 56 provides the composition of any one of Examples 31-52, wherein contacting the medical device with a cleaning composition comprises flushing the cleaning composition through an interior area of the medical device.

Example 57 provides the composition of Example 53, wherein the interior area is defined by one or more cavity, lumen, or channel.

Example 58 provides the composition of Example 53 or 54, wherein flushing is performed with the assistance of a flushing aid machine.

Example 59 provides the composition of Example 55, wherein the flushing aid machine is equipped with a spectrometer, a luminometer, a photometer, a fluorometer, a light source which emits light at a wavelength of 300-390 nm, a sensor which detects light at a wavelength of 436-475, or a combination thereof.

Example 60 provides the composition of any one of Examples 41-52, wherein sustaining contact comprises collecting and recirculating the flushed cleaning composition through the medical device with the assistance of a flushing aid machine.

Example 61 provides the composition of any one of Examples 31-52, wherein the medical device is contacted with the cleaning composition in an automated endoscope reprocessor.

Example 62 provides the composition of Example 58, wherein the automated endoscope reprocessor is equipped with a spectrometer, a luminometer, a photometer, a fluorometer, a light source which emits light at a wavelength of 300-390 nm, a sensor which detects light at a wavelength of 400-475, or a combination thereof.

Example 63 provides the composition of any one of Examples 31-59, wherein the medical device is a flexible endoscope.

Example 64 provides a method of preparing a cleaning composition, comprising mixing a detergent having a pH of about 9.0 to about 13.0 together with a high-level disinfectant comprising ortho-phthalaldehyde to provide the cleaning composition.

Example 65 provides the method of Example 61, wherein the detergent comprises at least one of propylene glycol and diethylene glycol monoethyl ether.

Example 66 provides the method of Example 61 or 62, wherein the high-level disinfectant comprises C9-C11 ethoxylated alcohols.

Example 67 provides the method of any one of Examples 61-63, wherein the cleaning composition comprises ortho-phthalaldehyde and surfactant, and has a pH of about 9.0 to about 13.0.

Example 68 provides a kit, comprising: a detergent having a pH of about 9.0 to about 13.0 in a first container; a high-level disinfectant comprising ortho-phthalaldehyde in a second container; and printed indicia including instructions to combine the detergent with the high-level disinfectant.

What is claimed is:

1. A composition for detecting residual biological material, the composition comprising ortho-phthalaldehyde, a glycol, a surfactant, a buffer system, an Arrhenius base, a chelator, a corrosion inhibitor and water, wherein the composition has a pH between 11.9 and 12.2; wherein the composition is an aqueous solution.

2. The composition of claim 1, wherein the Arrhenius base is lithium hydroxide, sodium hydroxide, potassium hydroxide, cesium hydroxide, magnesium hydroxide, or calcium hydroxide.

3. The composition of claim 1, wherein ortho-phthalaldehyde is at least 0.35 wt % of the composition.

4. The composition of claim 3, wherein ortho-phthalaldehyde is 0.35 wt % to about 1.00 wt % of the composition.

5. The composition of claim 1, wherein the surfactant comprises one or more non-ionic surfactant.

6. The composition of claim 5, wherein the surfactant comprises one or more ethoxylated alcohol.

7. The composition of claim 6, wherein the surfactant comprises C9-C11 ethoxylated alcohols.

8. The composition of claim 7, wherein about 0.05 wt % to about 10 wt % of the composition is C9-C11 ethoxylated alcohol.

9. The composition of claim 1, wherein the buffer system is a mixture of potassium phosphate dibasic and sodium hydroxide.

10. The composition of claim 1, further comprising a glycol ether.

11. The composition of claim 10, wherein the glycol ether is about 0.05 wt % to about 10 wt % of the composition.

12. The composition of claim 10, wherein the glycol ether is diethylene glycol monoethyl ether.

13. The composition of claim 1, wherein the chelator is ethylenediaminetetraacetic acid.

14. The composition of claim 1, wherein the corrosion inhibitor is benzotriazole or sodium dodecyl sulfate.

15. The composition of claim 1, further comprising an antifoaming agent.

16. The composition of claim 15, wherein the antifoaming agent is a polyoxypropylene-polyoxyethylene block copolymer.

17. A composition comprising:

ortho-phthalaldehyde which is 0.35 wt % to about 1.00 wt % of the composition, propylene glycol which is about 0.10 wt % to about 20.0 wt % of the composition, C9-C11 ethoxylated alcohols which are about 0.05 wt % to about 10 wt % of the composition, ethylenediaminetetraacetic acid which is about 0.01 wt % to about 2 wt % of the composition, phosphate buffer, sodium hydroxide, an Arrhenius base and water; wherein the composition is in liquid form and has a pH between 11.9 and 12.2, wherein the composition is an aqueous solution.

18. The composition of claim 1, wherein the solution contains no straight chain alcohols.

19. The composition of claim 17, wherein the composition is suitable for assessing cleanliness.

20. The composition of claim 17, wherein the composition is suitable for the detection of residual biological material.

* * * * *